United States Patent
Cotter et al.

(10) Patent No.: US 6,899,219 B2
(45) Date of Patent: May 31, 2005

(54) TAPE DRIVE CONVEYOR

(75) Inventors: David H. Cotter, Coopersville, MI (US); Ryan D. Tasma, Middleville, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/411,924

(22) Filed: Apr. 11, 2003

(65) Prior Publication Data

US 2003/0192774 A1 Oct. 16, 2003

Related U.S. Application Data

(60) Provisional application No. 60/427,305, filed on Nov. 18, 2002, provisional application No. 60/420,508, filed on Oct. 23, 2002, and provisional application No. 60/372,168, filed on Apr. 12, 2002.

(51) Int. Cl.$^7$ ............................................. B65G 13/07
(52) U.S. Cl. ............................ 198/781.09; 198/781.03; 198/790
(58) Field of Search ................... 198/781.02, 781.03, 198/781.09, 790, 781.1, 781.11

(56) References Cited

U.S. PATENT DOCUMENTS

| | | | |
|---|---|---|---|
| 2,493,479 A | 1/1950 | Eggleston | 198/790 |
| 3,255,865 A | 6/1966 | Sullivan | 198/127 |
| 3,306,430 A | 2/1967 | Fogg | 198/790 |
| 3,420,355 A | 1/1969 | DeGood et al. | 198/781.06 |
| 3,420,356 A | 1/1969 | DeGood | 198/127 |
| 3,598,225 A | 8/1971 | Merrick | 198/127 |
| 3,612,248 A | 10/1971 | Wallis | 198/37 |
| 3,724,642 A | 4/1973 | DeGood | 198/127 R |
| 3,730,330 A | 5/1973 | DeGood | 198/127 R |
| 3,770,102 A | 11/1973 | DeGood | 198/127 R |
| 3,854,576 A | 12/1974 | Bowman | 198/184 |
| 3,980,172 A | 9/1976 | DeGood | 198/781 |
| 4,074,805 A | 2/1978 | Bodewes | 198/790 |
| 4,109,783 A | 8/1978 | Vogt | 198/781 |
| 4,174,777 A | 11/1979 | Riehle | 198/781 |
| 4,219,115 A | 8/1980 | Moore | 198/781 |
| 4,252,234 A | 2/1981 | Brouwer | 198/790 |
| 4,264,004 A * | 4/1981 | Harwick | 198/781.06 |
| 4,266,659 A | 5/1981 | Meyer et al. | 198/781 |
| 4,273,239 A | 6/1981 | Thwaites et al. | 198/781 |
| 4,293,065 A | 10/1981 | Dyer et al. | 198/781 |
| 4,297,121 A | 10/1981 | Rhonehouse | 65/348 |
| 4,311,231 A | 1/1982 | Milazzo | 198/781 |
| 4,318,468 A | 3/1982 | Bodewes et al. | 198/718 |
| 4,361,224 A | 11/1982 | Bowman | 198/781 |

(Continued)

FOREIGN PATENT DOCUMENTS

| | | | |
|---|---|---|---|
| DE | 29619258 | 5/1997 | ......... B65G/13/071 |
| DE | 19912391 | 11/1999 | ........... B65G/13/07 |
| DE | 29916538 | 3/2001 | ........... B65G/13/06 |
| EP | 0505206 | 9/1992 | ........... C03B/35/16 |
| GB | 2098566 | 11/1982 | ........... B65G/13/06 |

*Primary Examiner*—Khoi H. Tran
*Assistant Examiner*—Mark A. Deuble
(74) *Attorney, Agent, or Firm*—Van Dyke, Gardner, Linn & Burkhart, LLP

(57) ABSTRACT

A roller conveyor includes opposite sidewalls and at least two tandem zones. Each zone includes a plurality of idler rollers rotatably mounted at and between the opposite sidewalls, and a drive system having a motorized or directly driven roller. The driven roller is operable to drive the idler rollers via a drive member, which is positioned substantially beneath the idler rollers and in substantially continuous contact with a lower portion of at least some of the idler rollers. The driven roller may be selectively operable to provide accumulation of at least two articles in each of the zones. The roller conveyor may include a control which is operable to selectively operate the driven roller, such as in response to at least one article sensor along the roller conveyor or in response to a current sensor for sensing a current draw by the driven roller.

11 Claims, 15 Drawing Sheets

U.S. PATENT DOCUMENTS

| | | | |
|---|---|---|---|
| 4,361,225 A | 11/1982 | Saur | 198/781 |
| 4,362,238 A | 12/1982 | Rivette | 198/781 |
| 4,441,607 A | 4/1984 | Bowman et al. | 198/781 |
| 4,458,809 A | 7/1984 | White et al. | 198/790 |
| 4,502,593 A | 3/1985 | van den Goor | 198/781 |
| 4,534,462 A * | 8/1985 | Hoover et al. | 198/781.06 |
| 4,562,921 A | 1/1986 | Leemkuil et al. | 198/841 |
| 4,570,780 A | 2/1986 | Thwaites et al. | 198/781 |
| 4,721,203 A | 1/1988 | Kimball et al. | 198/781 |
| 4,753,339 A | 6/1988 | Vogt et al. | 198/781 |
| 4,817,784 A | 4/1989 | Judge | 198/781 |
| 4,832,184 A | 5/1989 | DeGood | 198/781 |
| 4,895,247 A | 1/1990 | Marchetti | 198/790 |
| 4,919,255 A | 4/1990 | Morgan et al. | 198/781 |
| 4,951,808 A | 8/1990 | Collins et al. | 198/781 |
| 5,056,653 A | 10/1991 | Lancaster | 198/790 |
| 5,191,967 A | 3/1993 | Woltjer et al. | 198/781 |
| 5,211,281 A * | 5/1993 | Almes | 198/781.09 |
| 5,244,081 A | 9/1993 | Kajii et al. | 198/790 |
| 5,285,887 A * | 2/1994 | Hall | 198/460.1 |
| 5,348,140 A | 9/1994 | Clos | 198/790 |
| 5,429,225 A | 7/1995 | Schiesser et al. | 198/781.06 |
| 5,540,323 A | 7/1996 | Schiesser et al. | 198/781.06 |
| 5,906,268 A * | 5/1999 | Kalm | 198/781.06 |
| 6,035,999 A | 3/2000 | Hall | 198/781.06 |
| 6,047,812 A * | 4/2000 | Horn et al. | 198/781.06 |
| 6,158,574 A | 12/2000 | Williams et al. | 198/791 |
| 6,223,888 B1 | 5/2001 | Jahns | 198/781.03 |
| 6,253,909 B1 | 7/2001 | Kalm et al. | 198/781.06 |
| 6,412,623 B2 | 7/2002 | Axmann et al. | 198/791 |
| 6,522,944 B2 * | 2/2003 | Majcher et al. | 700/224 |
| 2001/0004959 A1 | 6/2001 | Cotter et al. | 198/790 |
| 2001/0010285 A1 * | 8/2001 | Itoh et al. | 198/781.06 |

* cited by examiner

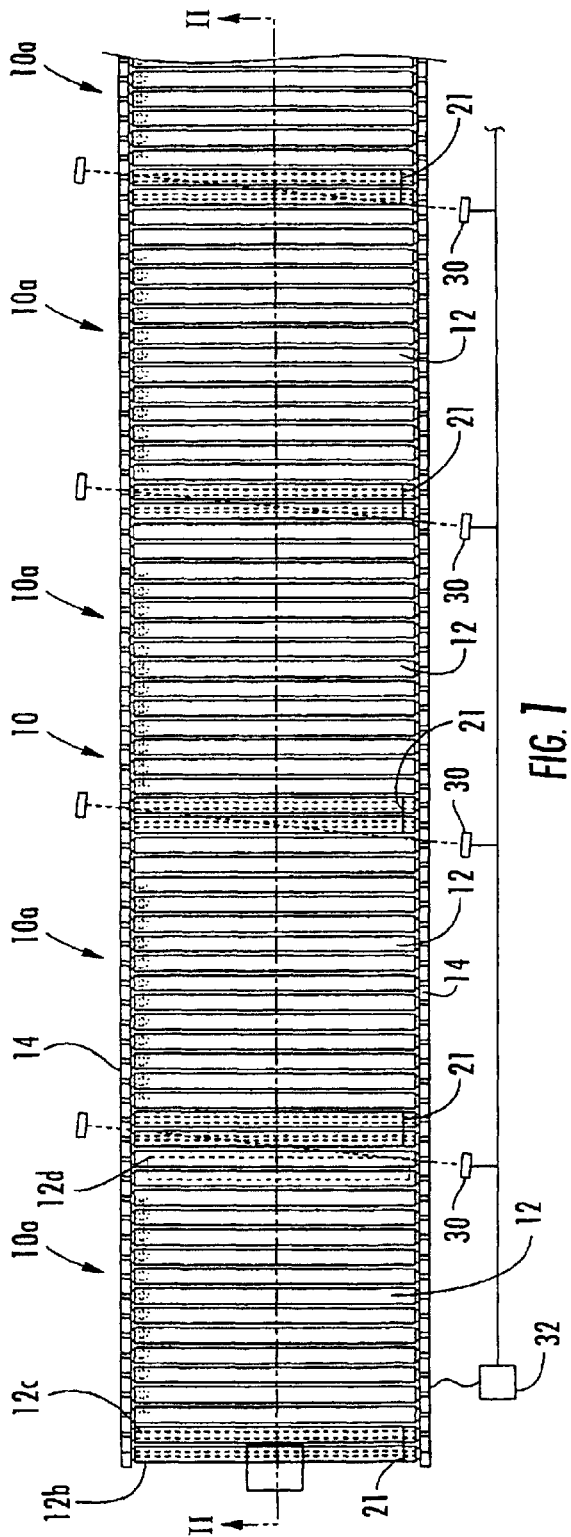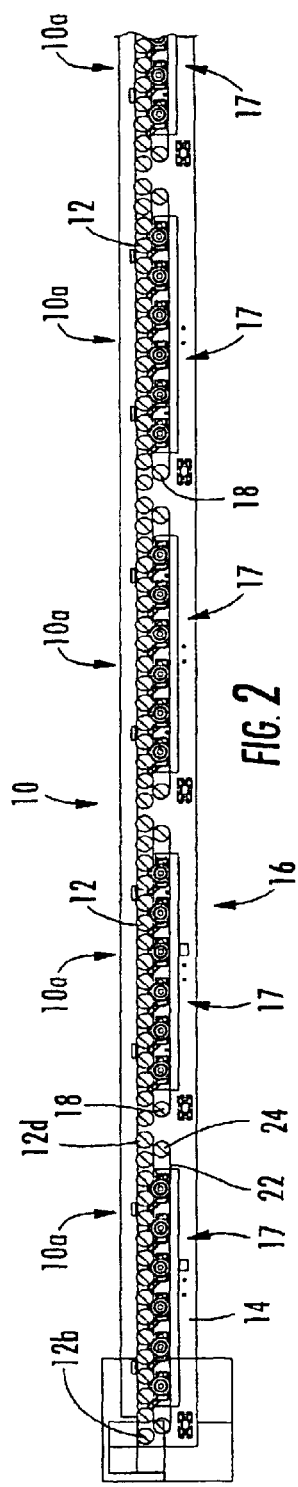

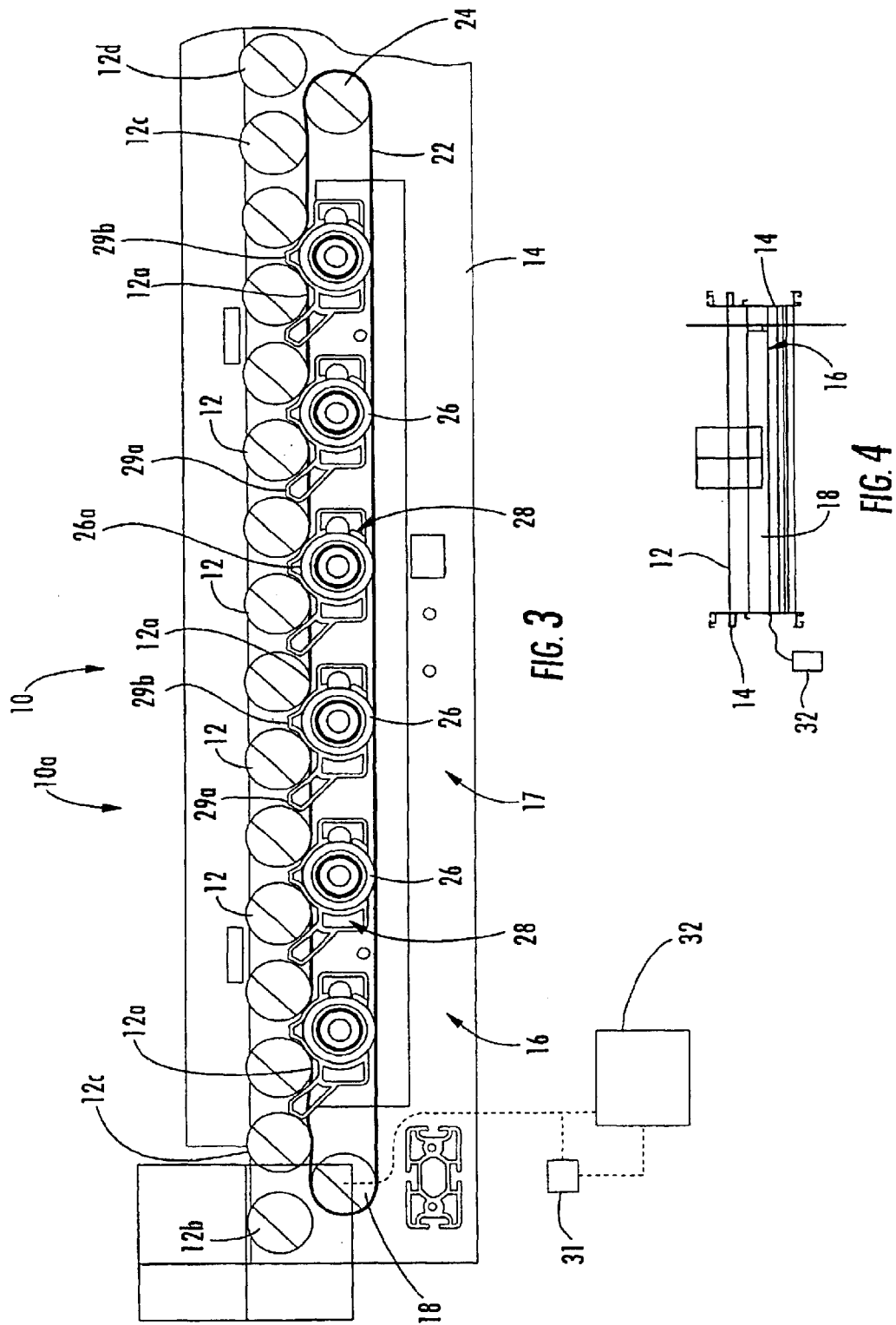

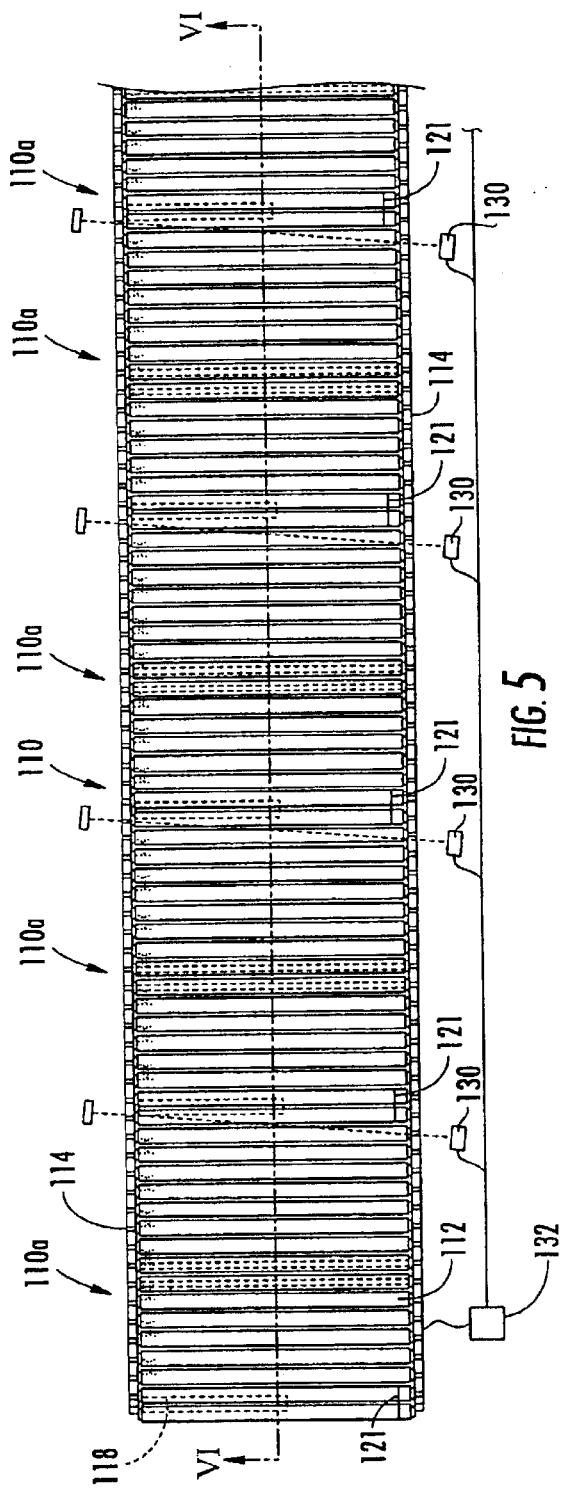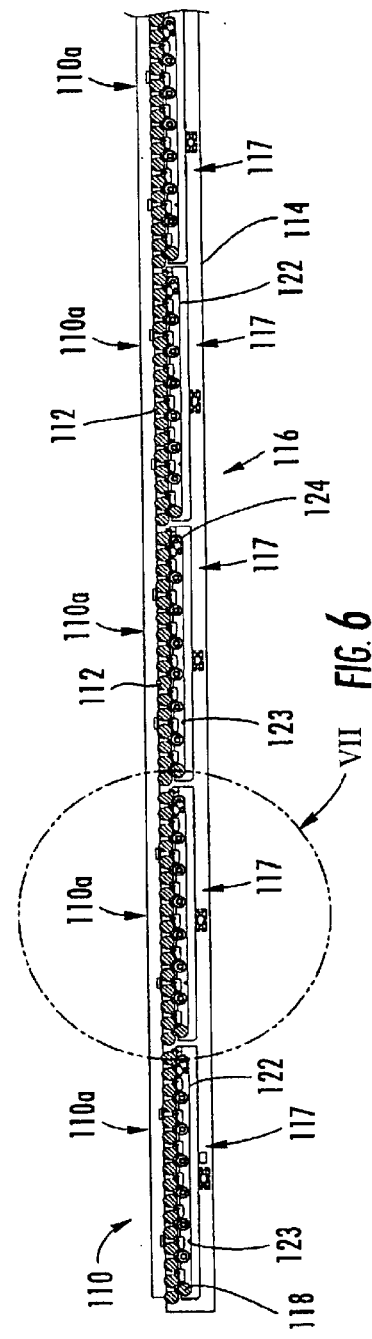

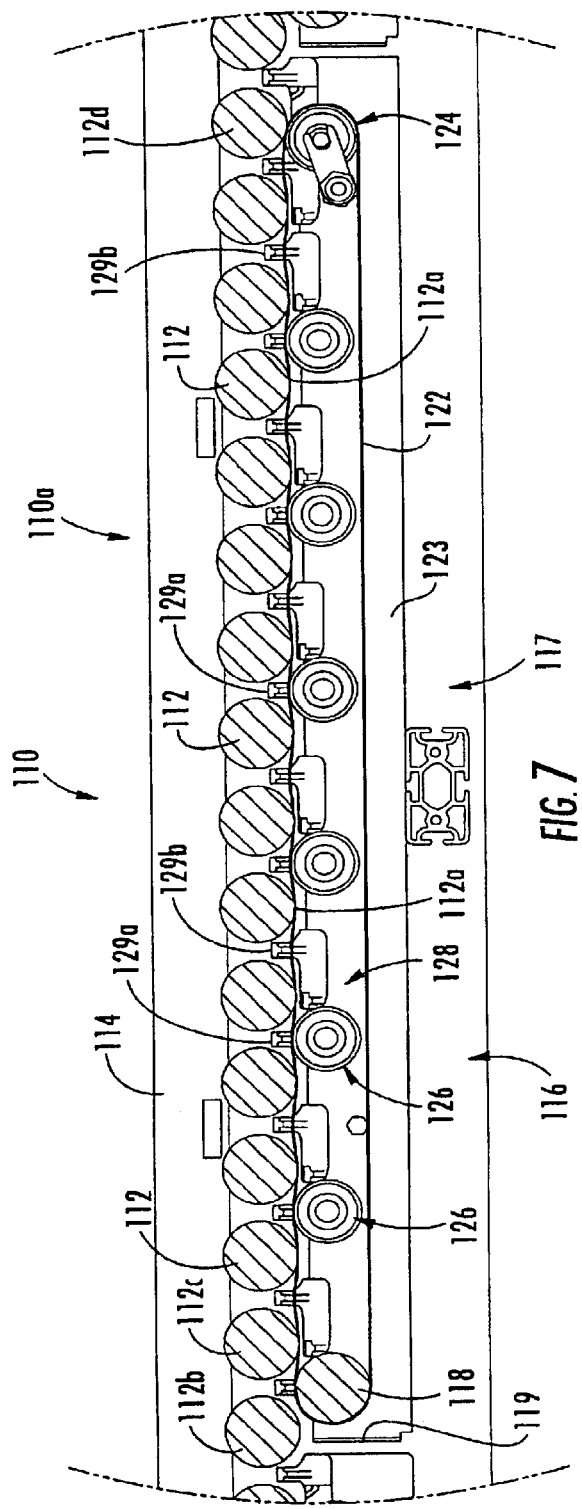
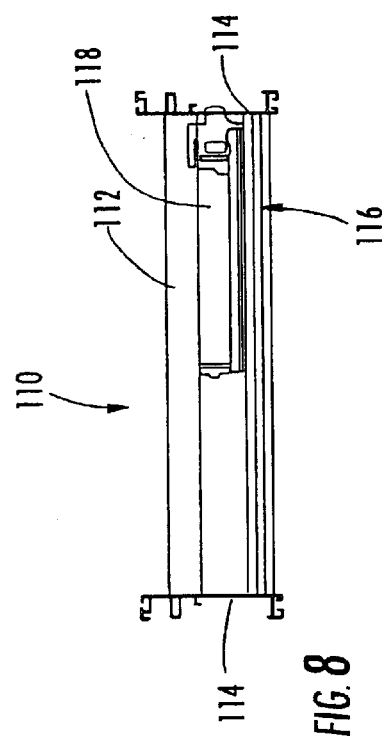
FIG. 7
FIG. 8

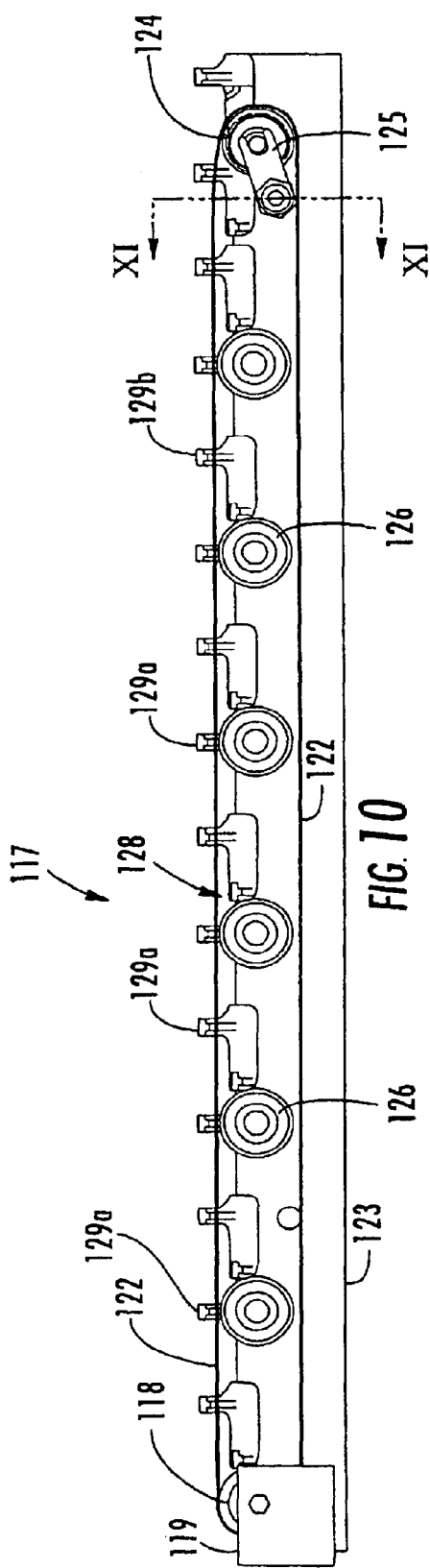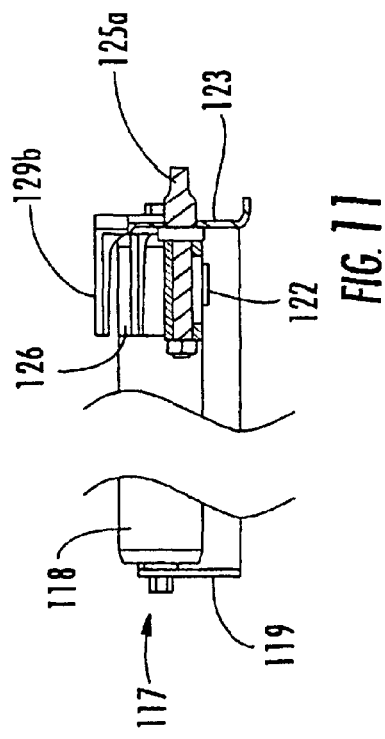

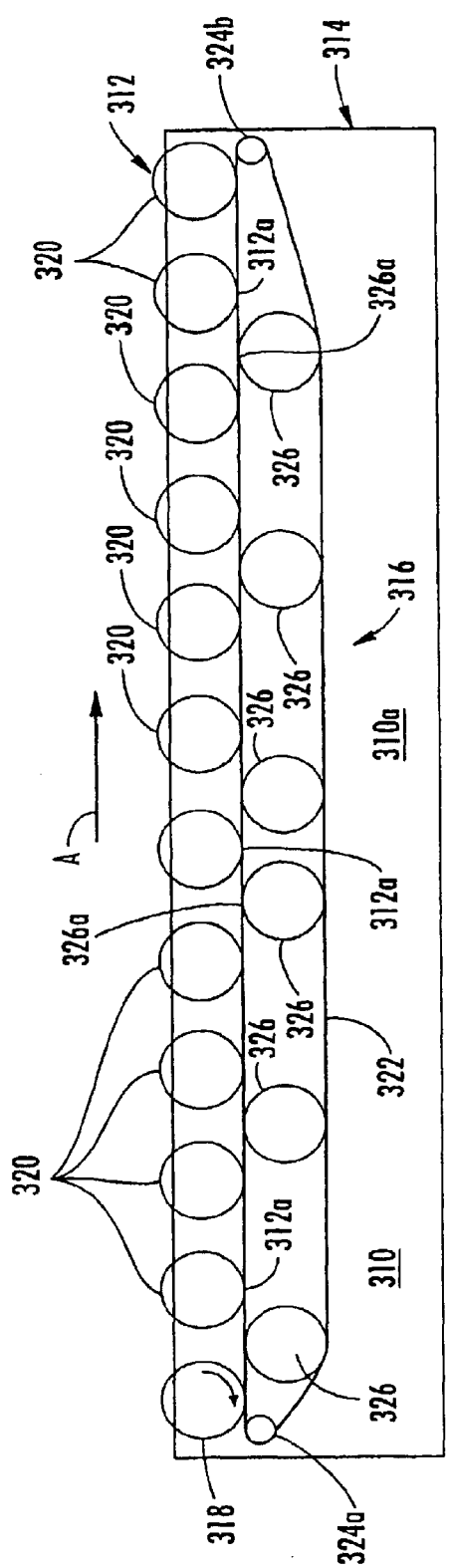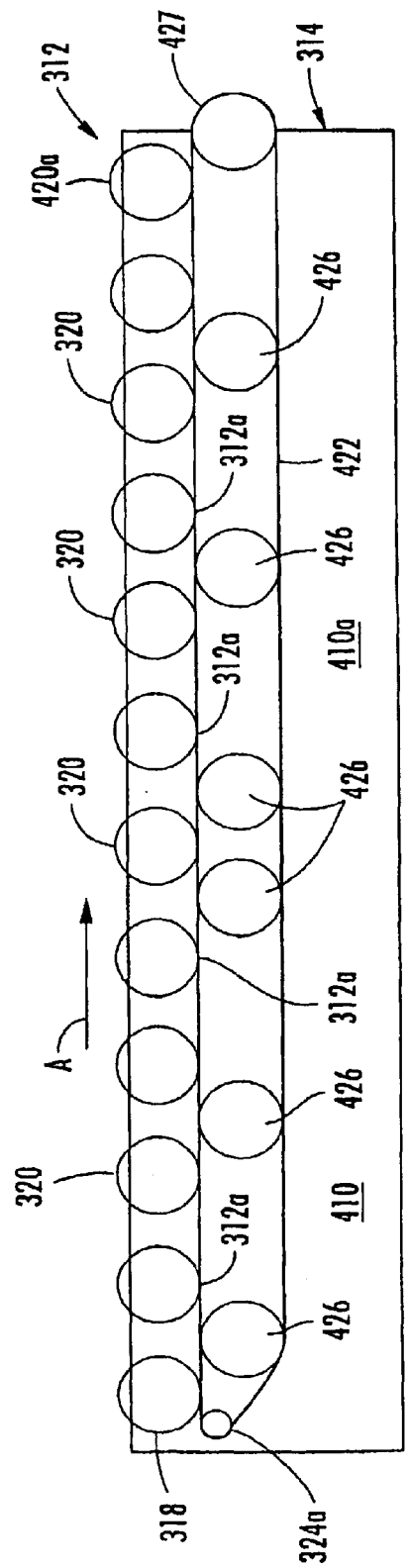

TAPE DRIVE CONVEYOR

CROSS REFERENCE TO RELATED APPLICATIONS

The present application claims the benefit of U.S. provisional applications, Ser. No. 60/427,305, filed Nov. 18, 2002; Ser. No. 60/420,508, filed Oct. 23, 2002; and Ser. No. 60/372,168, filed Apr. 12, 2002, which are all hereby incorporated herein by reference in their entireties.

FIELD OF THE INVENTION

The present invention relates generally to conveyors and, more particularly, to roller conveyors.

BACKGROUND OF THE INVENTION

Roller conveyors are known and typically include at least one powered or motorized roller and a plurality of idler or freely rotating rollers. The idler rollers are driven via the powered roller and a plurality of O-rings or bands around adjacent rollers. For example, the motorized roller may be connected to and drive an adjacent idler roller via one O-ring, while the adjacent idler roller may in turn be connected to and drive a second adjacent idler roller via another O-ring, and so on along a zone or set of rollers of a roller conveyor. The O-rings are thin rubber bands positioned within grooves at an end of the rollers.

The O-rings of such conveyors are thin and, thus, may burn out and break if slipping occurs between the roller and the O-ring, such as may occur during starting and stopping of the rollers when articles are positioned on the rollers. In order to replace the O-rings, the rollers have to be at least partially removed from the sidewalls of the conveyor. Because slippage often occurs between the rollers and the O-rings during starting and stopping of the rollers when articles are positioned on the rollers, such roller conveyors are not well-suited for accumulating articles on one or more zones of the conveyor. Also, the speed of such known roller conveyors is typically limited to approximately 150 to 200 feet per minute (fpm) to reduce wear on the O-rings.

SUMMARY OF THE INVENTION

The present invention provides a tape drive system for driving a plurality of idler rollers of a roller conveyor. The tape drive system is operable to drive a plurality of rollers of a zone or section of a roller conveyor in response to one or more powered or motorized rollers and a continuous tape or belt engaging a lower surface of the rollers of the zone. The tape drive system is driven by at least one powered or motorized roller, and includes a tape or belt which engages a portion of the motorized roller and a lower portion of at least some of the idler rollers, but is not wrapped or routed or reeved around the idler rollers of the roller conveyor.

According to an aspect of the present invention, a tape drive system for driving idler rollers of a roller conveyor comprises a motorized roller, a plurality of snubbers and a belt reeved around the plurality of snubbers. The motorized roller includes an internal motor which is operable to rotate a roller portion of the motorized roller relative to an axle portion or mounting portion of the motorized roller. The snubbers are configured and positionable to urge the belt into engagement with the idler rollers to drive the idler rollers in response to rotation of the roller portion of the motorized roller.

According to another aspect of the present invention, a roller conveyor comprises a tape drive system and a plurality of idler rollers rotatably mounted at and between opposite sidewalls of the conveyor. The tape drive system comprises a motorized roller, a plurality of snubbers and a tape or belt reeved around the plurality of snubbers. The motorized roller includes an internal motor which is operable to rotate a roller portion of the motorized roller relative to an axle portion or mounting portion of the motorized roller. The snubbers are configured and positioned to urge the tape into engagement with the idler rollers to drive the idler rollers in response to rotation of the roller portion of the motorized roller.

The roller conveyor may include a control which is operable to selectively activate and deactivate the internal motor of the motorized roller. The roller conveyor may also include at least one article sensor which may be positioned along the roller conveyor and operable to sense articles being conveyed along the roller conveyor. The control may be operable to selectively activate and deactivate the motorized roller in response to the at least one article sensor. Optionally, the roller conveyor may include a current sensor which is operable to sense the current draw of the motor of the motorized roller, whereby the control may be operable to selectively activate and deactivate the motorized roller in response to the current sensor.

In one form, the tape may be reeved around the roller portion of the motorized roller and around the plurality of snubbers. The motorized roller, snubbers and tape may be positioned underneath the idler rollers and the tape may be urged into engagement with a lower surface of the idler rollers by the snubbers. Optionally, the tape may be reeved around the motorized roller, the plurality of snubbers and an adjustable end roller, whereby the adjustable end roller is adjustable to adjust a tension in the tape.

In another form, the motorized roller may be mounted between the sidewalls of the roller conveyor. The motorized roller and the idler rollers may define a conveying surface of the roller conveyor. The snubbers may be configured to urge the tape into engagement with the motorized roller and the idler rollers.

According to another aspect of the present invention, a roller conveyor comprises at least two tandem zones comprising a plurality of idler rollers rotatably mounted at and between opposite sidewalls of the conveyor. Each of the zones comprises a drive system and at least one article sensor operable to detect articles in that zone. Each drive system comprises a directly driven roller, which is directly drivable to drive or rotate the idler rollers via a drive member. The drive member is positioned substantially beneath the idler rollers and is in generally continuous contact with a lower portion of at least some of the idler rollers. A control is operable to selectively activate and deactivate the directly driven roller in response to the at least one article sensor to provide accumulation of at least two articles in each zone of the roller conveyor.

The conveyor may comprise multiple sections or zones, with each zone comprising a respective drive system and article sensor. The drive systems may be independently operable in response to the article sensor or sensors to accumulate at least two articles on the idler rollers of a zone of the roller conveyor. The drive member may be configured to slip relative to the lower portion of the idler rollers to allow for rotation of the idler rollers when the directly drivable roller is deactivated.

In one form, the directly driven roller may comprise a motorized roller having an internal motor operable to rotate a roller portion of the motorized roller relative to a shaft portion or mounting portion of the motorized roller. In another form, the directly driven roller may comprise a roller or pulley or drum and a motor positioned at the sidewall of the conveyor and operable to directly drive the driven roller. The motor may be positioned at an angle relative to an axis of rotation of the driven roller with an angled gear box between the driven roller and the motor to directly drive the driven roller in response to rotational driving of the motor.

According to another aspect of the present invention, a roller conveyor includes at least one powered or motorized roller or directly driven roller, at least one idler roller and a tape drive system. The tape drive system includes at least one snubber and a continuous tape or belt which is guided or reeved around a pair of end rollers positioned generally beneath a level of the motorized and idler rollers. The at least one snubber is positioned to engage the tape with a lower surface of the at least one motorized roller and a lower surface of the at least one idler roller, such that the tape imparts rotation onto the at least one idler roller in response to rotation of the motorized roller.

The conveyor may include a plurality of idler rollers at each side of the motorized roller. The conveyor may include a snubber at each side of the motorized roller and at least one additional snubber beneath and generally between a pair of adjacent idler rollers. The snubbers may all function to engage the tape against the respective rollers of the conveyor. Optionally, the snubbers may be movable to selectively disengage the tape from the lower surface of the rollers.

Therefore, the present invention provides a tape or belt drive system for a powered roller conveyor that does not require multiple individual O-rings around adjacent pairs of rollers. The tape drive system includes a single continuous tape or belt for driving a zone or section of rollers of the conveyor. The tape or belt of the present invention is more robust than conventional O-rings and does not burn out if slippage occurs between the rollers and the tape or belt. The tape drive system of the present invention thus may be well-suited for accumulating articles on a zone of the conveyor, and is particularly suited for accumulating multiple articles on each zone of the conveyor. The tape drive system is also capable of increased operational speeds of the conveyor over conventional O-ring type roller conveyors.

These and other objects, advantages, purposes and features of the present invention will become apparent upon review of the following specification in conjunction with the drawings.

BRIEF DESCRIPTION OF THE DRAWINGS

FIG. 1 is a plan view of a roller conveyor and a tape drive system in accordance with the present invention;

FIG. 2 is a sectional view of the roller conveyor and tape drive system taken along the line II—II in FIG. 1;

FIG. 3 is an enlarged sectional view of a zone or section of the roller conveyor and tape drive system of FIG. 2;

FIG. 4 is an end elevation of the roller conveyor and tape drive system of FIG. 1;

FIG. 5 is a plan view of another roller conveyor and tape drive system in accordance with the present invention;

FIG. 6 is a sectional view of the roller conveyor and tape drive system taken along the line VI—VI in FIG. 5;

FIG. 7 is an enlarged sectional view of the area VII of FIG. 6;

FIG. 8 is an end elevation of the roller conveyor and tape drive system of FIG. 5;

FIG. 10 is a side elevation of the tape drive system of FIG. 9;

FIG. 11 is a sectional view of the tape drive system taken along the line XI—XI in FIG. 10;

FIG. 22 is a side elevation of another roller conveyor and tape drive system in accordance with the present invention;

FIG. 23 is a side elevation of another roller conveyor and tape drive system in accordance with the present invention.

DESCRIPTION OF THE PREFERRED EMBODIMENTS

Figure 9:
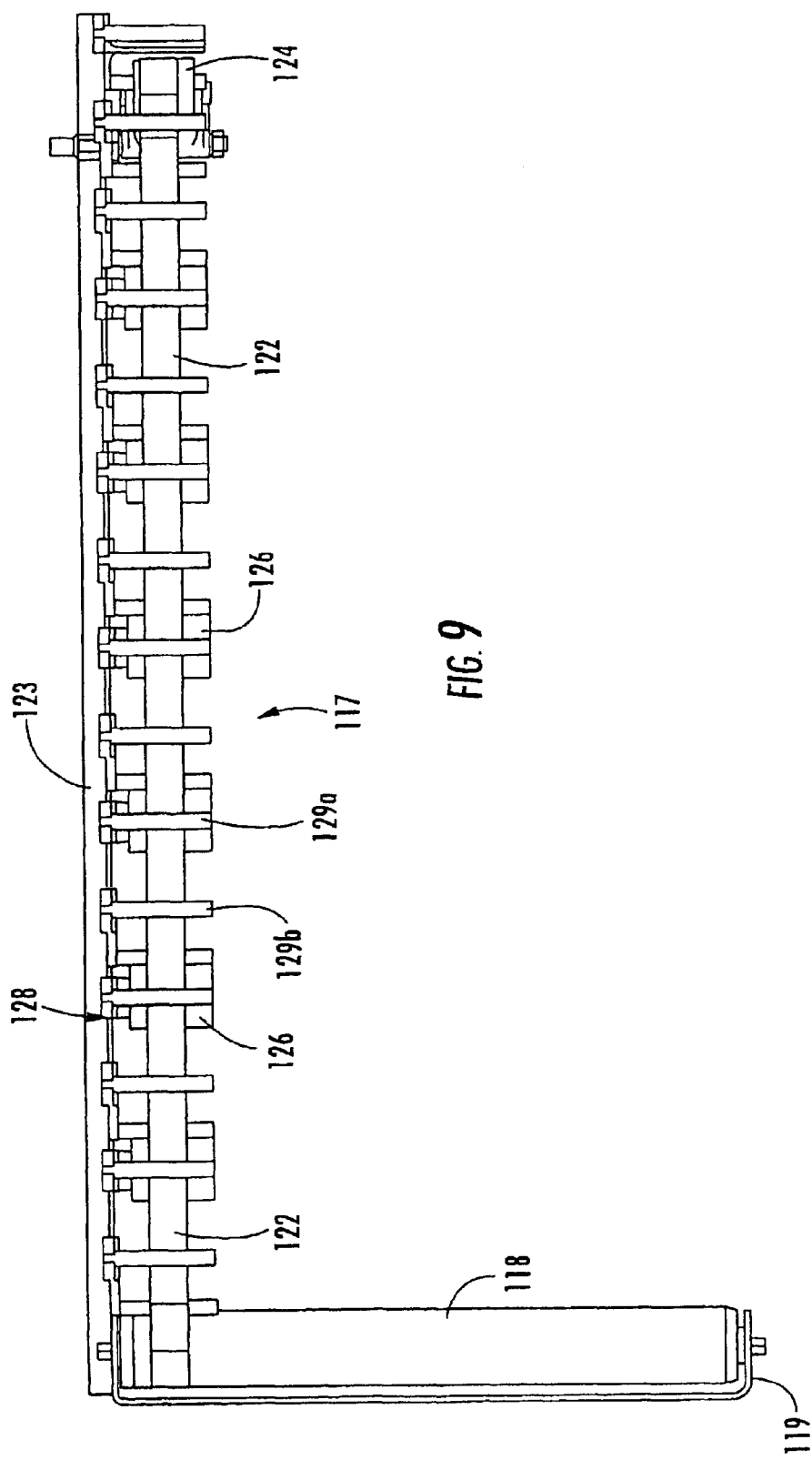
FIG. 9 is a plan view of a tape drive system in accordance with the present invention.

Referring now specifically to the drawings and the illustrative embodiments depicted therein, a roller conveyor 10 includes a plurality of rollers 12 mounted to and extending between a pair of opposite sidewalls 14, and a tape drive system 16 which is operable to drive the rollers 12 of the conveyor 10 via driving a drive member or tape or belt 22 which is engaged with the rollers 12 (FIGS. 1–4). The rollers 12 comprise a plurality of idler or freely rotating rollers and define a conveying surface of the conveyor 10. Tape drive system 16 may be divided into a series of two or more tape drive units 17 arranged in two or more tandem zones 10a, with each tape drive unit 17 including a continuous tape or belt 22 routed or reeved around a powered or motorized or directly driven roller 18 and an end roller or pulley or guide 24 of tape drive unit 17, such that the tape 22 is movable or drivable in a continuous loop around the driven roller 18 and guide 24 of each tape drive unit 17. Tape drive system 16 further includes a plurality of snubbers or engaging rollers or guides 26. Rotation of driven roller 18 causes corresponding rotation of the idler rollers 12 of the conveyor via tape 22 being snubbed or forced or urged against the lower portion 12a of the rollers 12 via snubbers 26, as discussed in detail below.

As best shown in FIGS. 2 and 3, snubbers 26 are positioned generally between at least some of the adjacent pairs of rollers 12, with tape 22 wrapped or reeved around the end guide 24, snubbers 26 and driven roller 18. In the illustrated embodiment, driven roller 18 is positioned at an end of the tape drive unit 17, which is positioned below rollers 12 of zone 10a of roller conveyor 10. Snubbers 26 are spaced along the zone 10a and positioned between some of the other adjacent pairs of rollers 12. The snubbers 26 are positioned upward and partially between the adjacent pairs of rollers, such that they are in an engaging position, whereby the snubbers force or urge tape 22 into engagement with the lower portion 12a of the adjacent rollers 12. Snubbers 26 may be positioned such that an upper surface or portion 26a of each snubber 26 may be at or above the lower surface or portion 12a of rollers 12, whereby tape 22 may be urged into engagement with the lower portion 12a of the rollers 12 at either side of the respective snubbers 26.

Because multiple snubbers 26 may be spaced along the zone 10a of the conveyor 10, the tape 22 may be forced into engagement with substantially each of the rollers 12 of the zone 10a. A snubber 26 may be positioned at approximately every other gap between adjacent rollers, such that substantially each roller 12 of zone 10a may have tape 22 pressed against the lower portion 12a of the roller by a snubber 26 positioned at at least one side of the roller 12, as can be seen in FIG. 3. Although snubbers 26 are illustrated as rollers, other guiding surfaces, such as low friction stationary surfaces can be used, without affecting the scope of the present invention. Also, the design and position of snubbers 26 may be different from that illustrated herein, without affecting the scope of the present invention.

Figure 19:
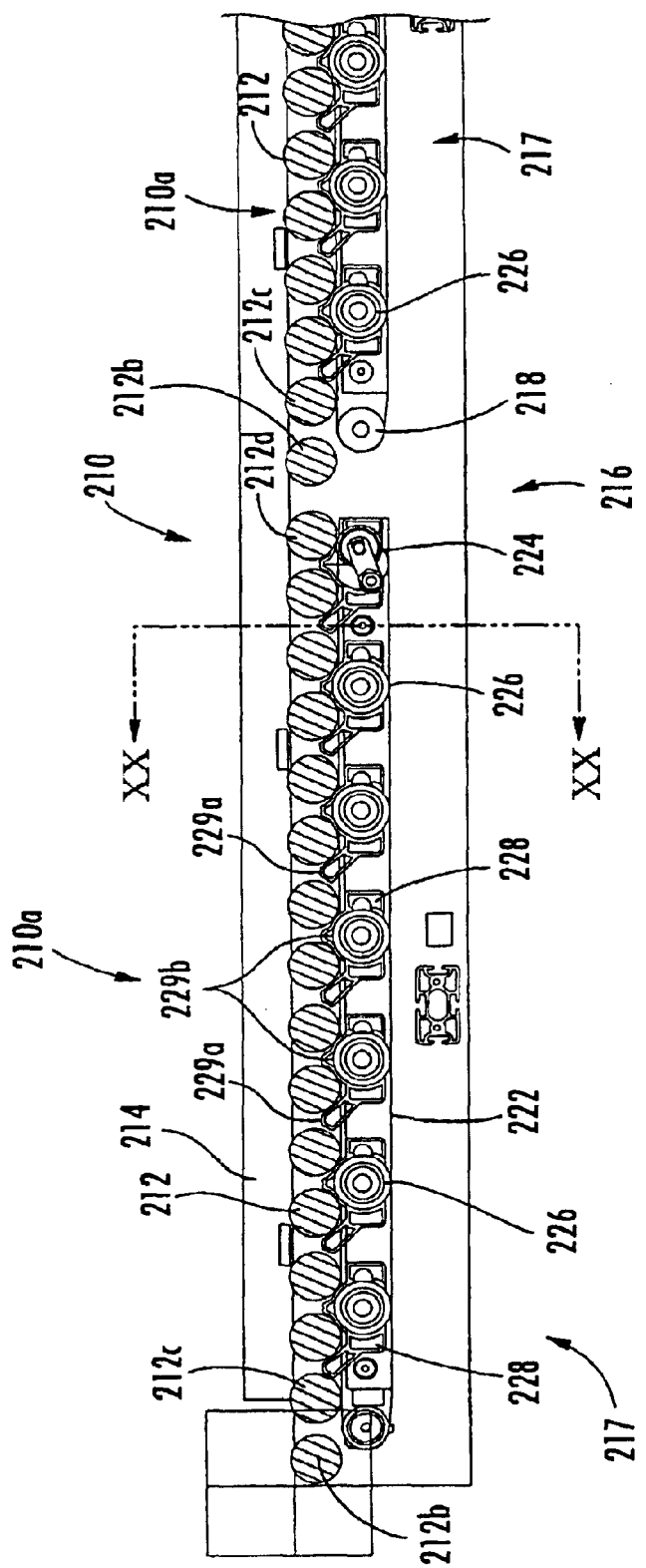
FIG. 19 is a sectional view of the roller conveyor section and tape drive system taken along the line XIX—XIX in FIG. 16.

As can be seen in FIG. 3, tape 22 may not engage the end rollers 12b, 12d of zone 10a, since the tape 22 is reversed around roller 18 and end guide 24 at the opposite ends of tape drive unit 17. Accordingly, the end rollers 12b, 12d of each zone 10a may include an O-ring 21 or the like (FIG. 1) connected between the end roller 12b, 12d and the adjacent roller 12c of the zone 10a, whereby the end rollers 12b, 12d may be rotatably driven with the other rollers of the zone 10a in response to tape drive unit 17. Optionally, one or both of the driven roller 18 and end guide 24 may be positioned outwardly toward the respective end roller 12b, 12d to engage the underside of the respective end roller 12b, 12d (such as shown in FIGS. 7 and 19 with respect to tape drive systems 116 and 216, respectively, and as discussed below), whereby the O-ring may not be included on the respective end rollers of the roller conveyor, without affecting the scope of the present invention. Optionally, and as can be seen with reference to FIGS. 1 and 2, the end roller 12b at the motorized roller 18 may be driven via an O-ring 21, while the opposite end roller 12d may not be driven and may freely rotate.

Optionally, and as best shown in FIG. 3, each snubber 26 may be rotatably mounted to a mounting assembly 28, which mounts the snubber at the sidewall 14 of the conveyor. Mounting assembly 28 may include spaced apart finger guards 29a, 29b which extend over tape 22. The finger guards 29a, 29b of each mounting assembly 28 are spaced apart at a desired separation distance which corresponds to the spacing between the idler rollers 12 of conveyor 10. Finger guards 29a, 29b provide protection against the tape catching a finger of a user who may otherwise be able to contact the moving components (the snubbers and tape) of the tape drive system and accumulating conveyor by reaching between the rollers 12.

Tape 22 is a continuous belt or tape which may be tightly reeved around the end guide 24, snubbers 26 and driven roller 18. Tape 22 may be a generally flat tape or belt and may be a stretch belt. For example, tape 22 may comprise a low modulus tape, and may have a stretch capability or characteristic of at least approximately 1.5% stretch or more (and may have a stretch capability or characteristic of approximately 3% to 5% stretch or more) in its lengthwise direction. Tape 22 may be initially stretched as it is reeved around the snubbers and driven roller, such that the tape has an initial stretch of approximately 0.75% or more in its lengthwise direction when positioned around the snubbers and roller, and may be initially stretched to have an initial stretch of approximately 1% or 1.5%. Tape 22 thus may provide a substantially greater amount of stretch over conventional tapes or belts, which typically may only provide approximately a 1% stretch characteristic or less, and typically may have an initial stretch of approximately 0.25% to 0.5% when reeved or positioned around the pulleys or snubbers of the tape drive system. The low modulus tape may be made from urethane extrusions or urethane with polyester or nylon tension members encapsulated or may be made from a rubber material or the like, and may be similar to the type of belts commercially available from Nitta Corporation for use in graphic arts and letter mail sorting. The low modulus characteristic of the tape and the approximately 0.75% or more initial stretch of the tape may allow each tape drive unit 17 of the tape drive system 16 to be operated with little or no take-up or adjustment being necessary to maintain the appropriate tension in tape 22. However, such adjustment may be provided on tape drive units 17, without affecting the scope of the present invention. For example, the end roller or snubber or guide may be adjustably positioned to adjust the tension in tape 22, such as discussed below with respect to end guide 124.

The material for tape 22 may be selected such that tape 22 provides sufficient frictional resistance to slippage on the driven roller, snubbers and end guide so as to efficiently move along and around the driven roller, snubbers and end guide and to drive the idler rollers in response to rotation of the motorized or powered or driven roller. Tape 22 may have a greater thickness than a conventional O-ring and, thus, may provide a more robust drive system than conventional O-rings.

Driven roller 18 may comprise a motorized or self driven roller with an internal motor which is operable to rotate a roller portion relative to a shaft portion or axle portion or mounting portion (not shown) of the roller. For example, motorized roller 18 may be of the type commercially available from various sources, such as a 12 Volt DC or 24 Volt DC motorized roller or the like. For example, the motorized roller may comprise a DC motorized roller, such as a 12 volt DC motorized roller or the like, such as a roller of the type disclosed in U.S. Pat. No. 6,244,427, the disclosure of which is hereby incorporated herein by reference. Optionally, the motorized roller may comprise a 24 volt DC motorized roller or a 42 volt DC motorized roller or a 48 volt DC motorized roller or the like. For example, the motorized roller may comprise a 48 volt DC motorized roller (or a 24 volt DC motorized roller) having a diameter of approximately 50 mm and an overall width of between 450 mm and 900 mm. The 48 volt DC motorized roller may comprise a DC brushless motor and may be operable at speeds between approximately 130 rpm and 1150 rpm and may provide an output of approximately 3 Nm of torque at approximately 400 rpm and approximately 1.5 Nm of torque at approximately 1150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

Motorized roller 18 drives tape 22 around snubbers 26 and end guide 24, whereby the tape moves along the lower surface of the idler rollers 12, which freely rotate about their shaft portions in response to the movement or driving of the tape 22. It should be understood that other directly driven rollers may be used to drive the tape, such as rollers that are directly driven from external sources, such as discussed below, without affecting the scope of the present invention.

The idler rollers 12 of conveyor 10 may be conventional, freely rotating rollers, such as the types also commercially available from various sources, such as Siemens Dematic Corporation, Rapistan Material Handling Automation Division of Grand Rapids, Mich. The shafts of the rollers may be mounted within holes or apertures (not shown) in sidewalls 14 to limit or substantially preclude upward movement of the rollers 12 due to the upward pressure exerted on the rollers via snubbers 26 and tape 22. Alternately, the rollers 12 may be mounted to the sidewalls 14 of the conveyor via any other mounting means, without affecting the scope of the present invention.

Accordingly, when motorized or driven roller 18 is activated, the roller portion of the driven roller is directly rotated or driven relative to its shaft portion. Rotation of the roller portion of driven roller causes tape 22 to move around driven roller 18 and snubbers 26 of the respective tape drive unit 17 and zone 10a. Tape 22 then functions to impart a corresponding rotation to the roller portions of the idler rollers 12 of conveyor 10 via rolling or frictional engagement with the idler rollers 12, whereby the end roller 12b and/or 12d may also be rotatably driven via the O-ring 21 and rotation of the adjacent roller 12c. Most or all of the idler rollers 12 of the zone 10a thus may be driven in response to activation of the motor of the motorized or driven roller 18 and engagement of the tape 22 with at least some of the idler rollers 12. The rotational driving of rollers 12 may be stopped by deactivating the motor of the motorized or driven roller 18. The motorized or driven roller of each tape drive unit and corresponding zone thus may provide an independently operable drive roller for each zone which is directly driven, whereby the tape drive system may not include any drive belts or bands between a drive motor and the driven roller.

Roller conveyor 10 may include one or more article or product sensors 30 (such as shown in FIG. 1), such as photosensors or photo-eyes or the like, positioned along the conveyor, such as at or near a downstream end of each zone 10a, and operable to detect articles being conveyed along the zone or conveyor. A control 32 may be included to control or activate and deactivate the internal motors of the motorized or driven rollers 18 (or other drive motors, such as the type shown in FIGS. 16–21 and as discussed below) of the tape drive units 17 of zones 10a in response to the product sensors 30, as discussed below.

Product sensors 30 may be any type of sensor, such as a sensor of the types disclosed in U.S. Pat. Nos. 5,582,286 and 6,253,909, and/or U.S. provisional application, Ser. No. 60/412,396, filed Sep. 20, 2002 by Haan et al, for CONVEYOR SYSTEM REVERSE-SLUG ACCUMULATION (Attorney Docket SIE04 P-109), which are hereby incorporated herein by reference. In the illustrated embodiment of FIGS. 1 and 2, conveyor 10 comprises at least five zones 10a, with each zone 10a having a tape drive unit 17 positioned beneath the rollers 12 of the zone and a product sensor 30 positioned at an end of the zone. However, the number of zones along a conveyor section is a function of the application and may vary without affecting the scope of the present invention.

In the illustrated embodiment, each product sensor 30 comprises a photosensor positioned at a downstream end of a respective zone 10a and operable to detect products or articles as they move from the downstream end of one zone to the upstream end of the adjacent zone. The motorized or driven roller 18 of the tape drive system 16 of a particular zone may be selectively activated or deactivated by control 32 in response to a corresponding product sensor 30, or in response to more than one of the product sensors positioned along the conveyor, to move or stop an article or articles that are present on the respective zone, as discussed below. Tape drive units 17 thus may be directly driven and operable to selectively and independently convey or accumulate one or more articles on the associated conveyor zones in response to one or more of the product sensors 30.

For example, it is envisioned that the driven rollers and associated tape drive units may be operable in a "sleep mode", such as described in U.S. Pat. Nos. 5,582,286 and 6,253,909, the disclosures of which are hereby incorporated herein by reference. In such a mode of operation, control 32 may activate the driven roller of a particular zone in response to an article being detected at the beginning of the zone (or at the end of the immediate upstream zone) and may deactivate the driven roller after the article is moved to the next or downstream zone, such that the driven roller of the tape drive unit of a particular zone is only activated when an article is present at the zone and when the article is to be conveyed along the zones of the conveyor. If the downstream zones are not activated, then the motorized roller of the particular zone may be deactivated to accumulate the detected article or articles on that particular zone of the conveyor. Such a sleep mode operation thus only activates the driven roller of a zone when an article to be conveyed is present at the particular zone, and thus reduces operation of the driven rollers to increase the life cycle of the rollers.

Because tape drive system 16 may provide for controlled limited slip between the rollers 12 and tape 22, tape drive system 16 may be operable to accumulate more than one article on a particular conveyor or zone of the conveyor. Accumulation of multiple articles may be accomplished because once a zone is stopped in response to accumulation of an article in that zone, the next article or product moved or conveyed from an upstream zone to the deactivated zone may coast or drift into the deactivated zone. The articles may then move or coast along the conveying surface to contact a stopped downstream article or articles. The tape drive system of the present invention thus may be operable to reduce or close the gaps between articles being conveyed along the roller conveyor, since the articles may coast along the rollers 12 (with the rollers 12 rotatably slipping over the tape 22) when the tape drive system is stopped or deactivated. The tape drive system of the present invention thus may provide for slug accumulation of articles on a zone or zones of a conveyor. Thus, the control may selectively activate and deactivate the driven roller 18 of each zone in response to product sensor or sensors 30 to control the accumulation of the articles on the zone or zones of the conveyor.

The tape drive system of the present invention may also be activated to move or convey articles into contact with other stopped or downstream articles on the conveyor, such as other articles positioned or accumulated on the same zone or on a downstream zone of the conveyor. Tape 22, if still being driven by the driven roller 18, may then slip against the rollers 12 as the article being conveyed stops against the downstream articles. The tape drive system of the present invention thus may provide for full contacting accumulation of articles along a conveyor and does not quickly burn out or wear out the tape or drive member. The present invention thus may provide for such full contacting accumulation without requiring excessive maintenance to replace burned out O-rings or the like.

Also, because the tape drive units 17 of tape drive system 16 may be individually and independently operated at an energized or deenergized state, but have a tape 22 that may readily slip along the underside of the rollers 12 when the rotation of the rollers is stopped by a stopped article on the conveying surface, the present invention also may function to reduce the line pressure in the articles being conveyed. If such slip between the tape and rollers and/or deactivation of the drive system were not provided, the line pressure on the articles, or the pressure exerted on articles positioned between upstream and downstream articles when the drive system is activated, may build up as multiple articles are moved into contact with one another along the conveying surface.

Optionally, it is envisioned that the snubbers 26 of each tape drive unit 17 may be vertically movable relative to the sidewalls 14 and the rollers 12 between an engaging position, whereby the tape 22 is snubbed or pressed against a lower portion 12a of the rollers 12 (as shown in FIG. 3), and a disengaging position, whereby the tape 22 is lowered and thus disengaged from the rollers 12 (not shown). The end guide 24 may also be vertically movable with respect to the sidewalls 14 and rollers 12 to move the ends of the tape 22 between the engaging and disengaging positions with respect to the rollers 12. The rollers 12 may then be driven in response to activation of the motorized or driven roller 18 and engagement of the tape 22 with the rollers 12. The tape 22 may be disengaged from the idler rollers 12 and/or the motorized or driven roller 18 may be deactivated to stop the driving of the rollers 12 of the zone 10a of conveyor 10.

Because the tape drive system of the present invention may be more robust than conventional O-ring systems, the tape drive system may not burn out as quickly if slippage occurs between the rollers and the tape, since the tape may be more robust and the rollers will slip on the tape only at the respective contact areas of the tape and rollers. Optionally, the conveyor may include a current sensor 31 (FIG. 3) for sensing or detecting a current flow of or a current draw by the motor of the motorized or driven roller, whereby the system may shut down or deactivate the motor in response to a threshold current or amperage being detected, in order to minimize the amount of slippage which may occur between the rollers and the tape. The increased amperage may be indicative of the tape encountering a resistance as the articles being conveyed along the rollers stop (such as when the articles encounter other downstream articles which are not moving), whereby the tape may slip along the underside of the rollers. Such slippage may increase the load on the motorized roller, which in turn will require an additional amount of current to continue to drive the motorized roller and tape. The control may then shut down the motorized or driven roller in response to the increase in amperage or current reaching a selected threshold amount, such that further driving of the tape may be at least temporarily stopped when such conditions are encountered. The tape drive system of the present invention thus may be well suited for accumulating two or more articles on a zone and for full contacting accumulation on the zone or zones of the conveyor without the high maintenance costs and down time associated with replacing burned out O-rings or the like. Also, because the tape drive system provides a more robust drive system, the conveyor may be capable of higher speed operation. For example, the roller conveyor and tape drive system of the present invention may be capable of conveying articles along the rollers at approximately 600 feet per minute.

Referring now to FIGS. 5–11, a roller conveyor 110 includes a plurality of rollers 112 mounted to and extending between a pair of opposite sidewalls 114, and a tape drive system 116 which is operable to drive the rollers 112 of the conveyor 110 via driving a drive member or tape or belt 122 which is engaged with the rollers 112. Roller conveyor 110 and tape drive system 116 are substantially similar to roller conveyor 10 and tape drive system 16 discussed above, such that a detailed discussion of the roller conveyor and tape drive system will not be repeated herein. Suffice it to say that tape drive system 116 includes a tape drive unit 117 at each zone 110a of roller conveyor 110. Each tape drive unit 117 includes a continuous tape or belt 122 which is routed or reeved around a motorized roller or driven roller 118, a plurality of snubbers or engaging rollers or guides 126 and an end roller or pulley or guide 124, such that the tape 122 moves in a continuous loop around the roller 118, snubbers 126 and guide 124. Rotation of a roller portion of the motorized roller 118 causes corresponding rotation of the idler rollers 112 of the conveyor 110 via tape 122 being snubbed or forced or urged against the lower portion 112a of the rollers 112 by snubbers 126, in a similar manner as discussed above.

As best shown in FIGS. 7, 9 and 10, each snubber 126 may be rotatably mounted to a mounting assembly 128, which is mounted to a sidewall or frame 123 of tape drive unit 117 of tape drive system 116. Each mounting assembly 128 includes spaced apart finger guards 129a, 129b which extend over tape 122. The finger guards 129a, 129b of each mounting assembly 128 are spaced apart at a desired separation distance which corresponds generally to the spacing between the idler rollers 112 of conveyor 110. The mounting assemblies 128 and snubbers 126 may be arranged and mounted along sidewall 123 in a cantilevered manner.

As best seen with reference to FIGS. 5, 8 and 9, motorized roller 118 may have a length which is less than the length of the idler rollers 112 of conveyor 110. Motorized roller 118 may be mounted to a mounting bracket 119 which extends from sidewall 123 of tape drive system 116. The motorized roller 118 thus may be mounted to the sidewall 123 and mounting bracket 119, with mounting bracket 119 being cantileverly mounted at sidewall 123. Such a mounting arrangement allows the tape drive system of the present invention to be installed or removed at a sidewall of the conveyor as a unit. The idler rollers 112 are positioned above the tape drive system 116 and between the opposite sidewalls 114 of conveyor 110. A smaller length motorized roller may thus be implemented with each tape drive unit 117, since the motorized roller is not part of the conveying surface and thus does not have to extend the entire width of the conveying surface of the conveyor.

As also best seen in FIGS. 9–11, end guide 124 may be adjustably mounted at the sidewall 123 of tape drive system 116 and/or sidewall 114 of conveyor 110, so that end guide 124 may be adjusted to adjust the tension in tape 122 that is reeved around the end guide 124, snubbers 126 and driven roller 118. In the illustrated embodiment, end guide 124 is rotatably mounted to a pivot arm 125 mounted to and extending from sidewall 123 of tape drive unit 117 (or the pivot arm may be mounted to a sidewall of the conveyor, without affecting the scope of the present invention). Pivot arm 125 may be pivotally mounted to sidewall 123 via a pivot pin 125a. Pivot arm 125 may be pivotally mounted to a cammed bolt or pin or cam assembly, such that pivot arm 125 and end guide 124 may be moved to the desired location to provide proper tension to the tape or belt 122 and substantially locked or snapped in place at or biased or urged toward that location. The end guide 124 may then be manually urged out of its locked position to reduce the tension in the tape, such as for removing the tape or installing a new tape at the tape drive system.

As can be seen in FIG. 7, the tape 122 at an end of tape drive unit 117 may not engage the end roller 112b at that end of zone 110a, where the tape 122 is reversed around roller 118. Accordingly, the end roller 112b of each zone 110a may include an O-ring 121 (FIG. 5) connected between the end roller 112b and the adjacent roller 112c of the zone 110a so that the end roller 112b may be rotatably driven with the other rollers of the zone 110a in response to actuation of tape drive unit 117. As can be seen in FIG. 7, end guide 124 may be positioned to be substantially beneath a respective end roller 112d of zone 110a, such that tape 122 may engage the end roller 112d or may be pinched between end guide 124 and end roller 112d to drive the end roller 112d in response to tape drive unit 117, such that no O-ring is positioned around the rollers at that end of the zone.

Similar to tape drive system 16, discussed above, when motorized roller 118 of tape drive system 116 is activated, the roller portion is rotated or driven relative to its shaft portion via an internal motor at least partially within the roller portion. Rotation of the roller portion of the motorized roller drives tape 122 around motorized roller 118, snubbers 126 and end guide 124. Tape 122 then functions to impart a corresponding rotation to the roller portions of the idler rollers 112 of roller conveyor 110 via rolling or frictional engagement with the idler rollers 112, while end roller 112b may be driven via O-ring 121. Most or all of the idler rollers 112 of the zone 110a thus may be driven in response to activation of the motorized roller 118 and engagement of the tape 122 with the idler rollers 112. The rollers 112 may be stopped by deactivating the motorized roller 118.

Also similar to tape drive system 16, discussed above, each tape drive unit 117 of tape drive system 116 may include or be associated with an article or product sensor 130 positioned at or between the zones 110a of conveyor 110. Tape drive system 116 may be operable, such as via a control 132 (FIG. 5), to convey and/or accumulate articles along or on the zones of the conveyor in response to the product sensor or sensors, such as described above. The tape drive system thus may be operable in response to the article sensors (or in response to a current sensor at each motorized roller, as discussed above) to accumulate articles on the zones of the conveyor.

Figure 12:
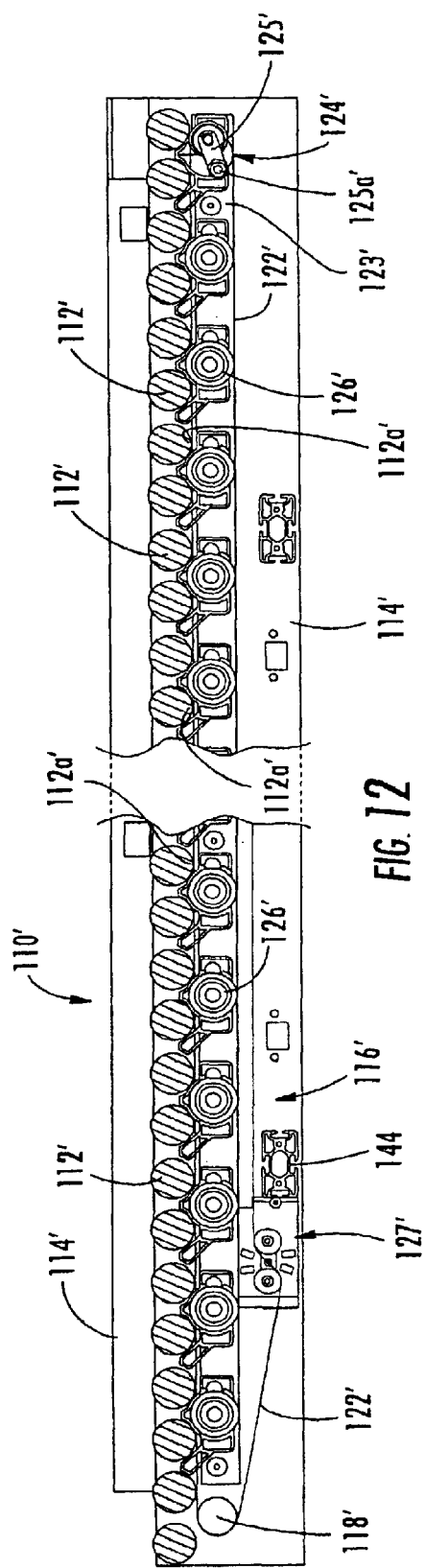
FIG. 12 is a side elevation of an elongated roller conveyor having a tape drive system in accordance with the present invention.

Referring now to FIGS. 12–15, a roller conveyor 110' includes a plurality of rollers 112' mounted to and extending between a pair of opposite sidewalls 114' and a tape drive system 116' which is operable to drive the rollers 112' of conveyor 110' via driving a tape or belt 122' which is engaged with rollers 112'. Tape drive system 116' includes a continuous tape or belt 122' which is routed or reeved around a motorized roller or driven roller 118', a plurality of snubbers or engaging rollers or guides 126' and an end roller or pulley or guide 124'. As can be seen in FIG. 12, conveyor 110' comprises an elongated conveyor, such as, for example, approximately three meters or more, which is driven by an elongated tape drive system 116'. Because of the length of tape drive system 116' and tape 122', tape drive system 116' may include a second take up device 127' for taking up the slack or initial stretch which may occur in the long tape or belt 122' and to thus provide proper tension in tape 122'. Tape 122' thus may be driven in a continuous loop around the roller 118', snubbers 126', end guide 124', and second take up device 127'. Roller conveyor 110' and tape drive system 116' may otherwise be substantially similar to roller conveyor 110 and tape drive system 116 discussed above, such that a detailed discussion of the conveyor and tape drive system will not be repeated herein. Rotation of a roller portion of motorized roller 118' causes corresponding rotation of the idler rollers 112' of the conveyor 110' via tape 122' being snubbed or forced or urged against the lower portion 112a' of at least some of the rollers 112' by snubbers 126', in a similar manner as discussed above.

As shown in FIG. 12, and as discussed above with respect to end guide 124, end guide 124' may be adjustably mounted at a sidewall 123' of tape drive system 116' and/or sidewall 114' of conveyor 110', so that end guide 124' may be adjusted to adjust the tension in tape 122' that is reeved around the end guide 124', snubbers 126' and driven roller 118'. End guide 124' may be rotatably mounted to a pivot arm 125' which may be pivotally mounted to sidewall 123' via a pivot pin 125a'. End guide 124' may be pivoted or biased to take up slack and adjust the tension in tape 122' when tape 122' is reeved around rollers 118', 112', end guide 124' and second take up device 127'. For example, end guide 124' may be adjustable to take up approximately one to two inches of slack or stretch in tape 122'.

Because of the length of tape 122' of elongated tape drive system 116', a greater amount of take up or tension adjustment may be desired, in order to take up the initial stretch characteristic of the tape, which may be approximately 1 percent initial stretch for a typical tape or belt material, so that the tape has the desired tension when reeved around rollers 118', 112', end guide 124' and second take up device 127'. For example, second take up device 127' may be adjustable, as discussed below, to take up approximately four to six inches, which may be desired to take up the initial stretch in the elongated tape 122' of tape drive system 116'. In the illustrated embodiment, second take up device 127' is mounted to sidewall 114' and generally below snubbers 126' and near motorized roller 118', but could be mounted elsewhere along tape drive system 116', without affecting the scope of the present invention.

Figure 13:
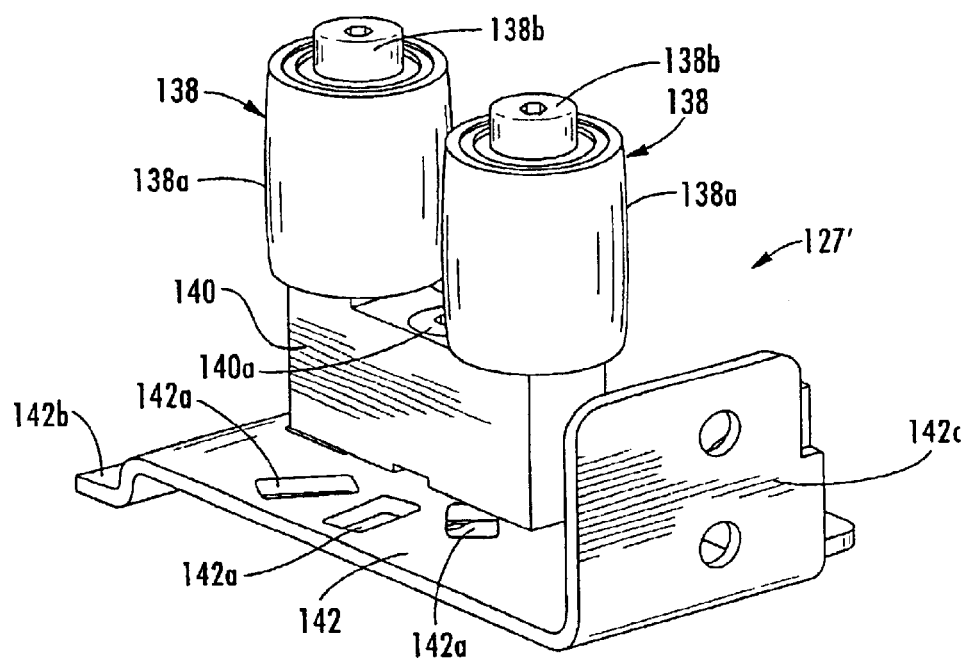
FIG. 13 is a perspective view of a take up device useful with the roller conveyor of FIG. 12.
Figure 14:
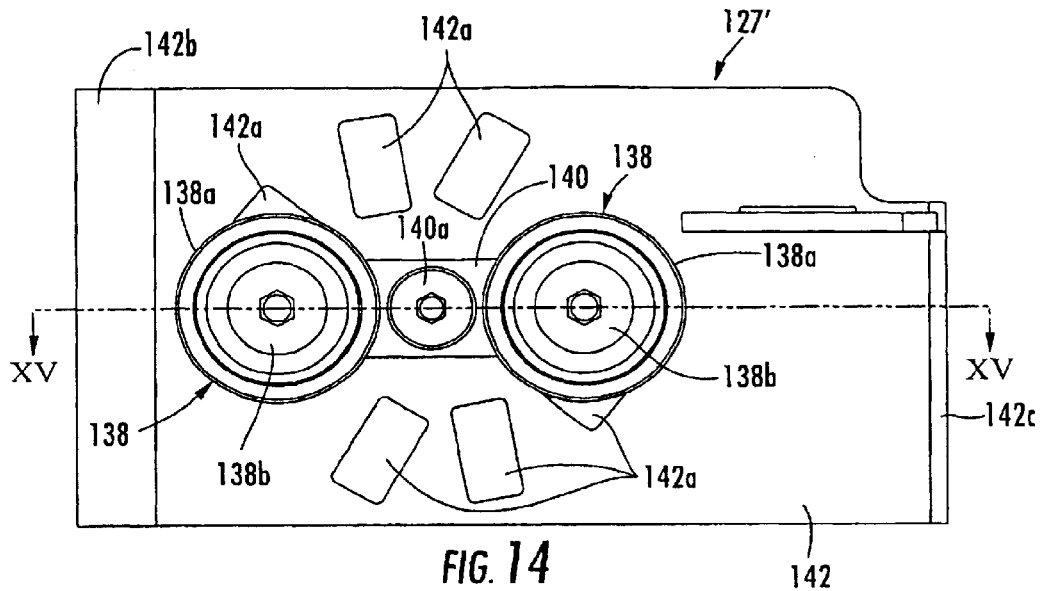
FIG. 14 is a side elevation of the take up device of FIG. 13.
Figure 15:
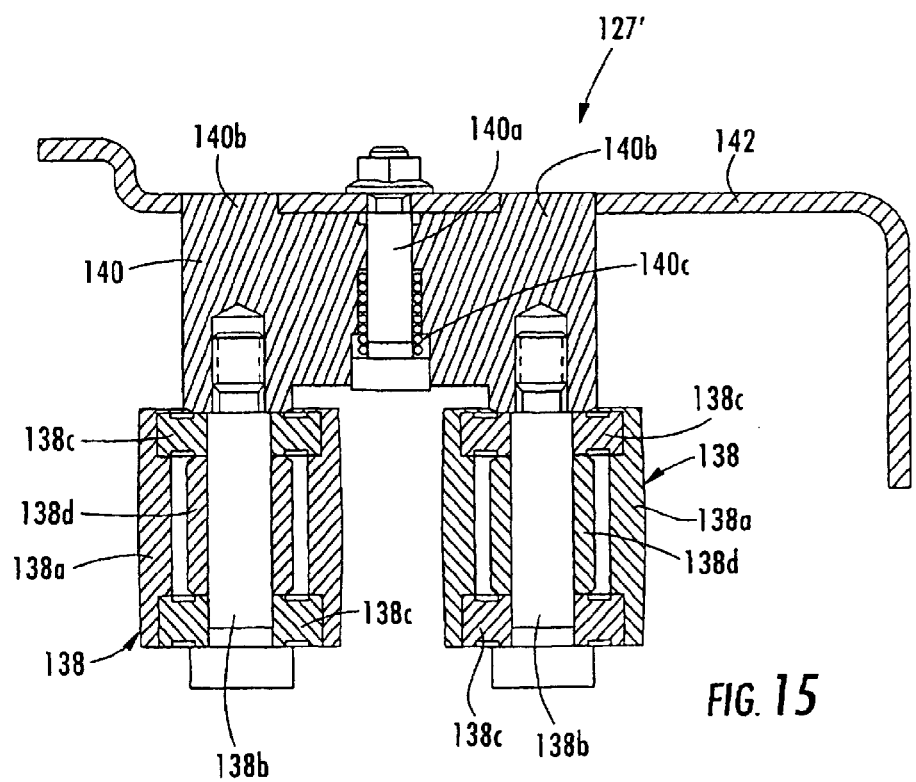
FIG. 15 is a sectional view of the take up device taken along the line XV—XV in FIG. 14.
Figure 16:
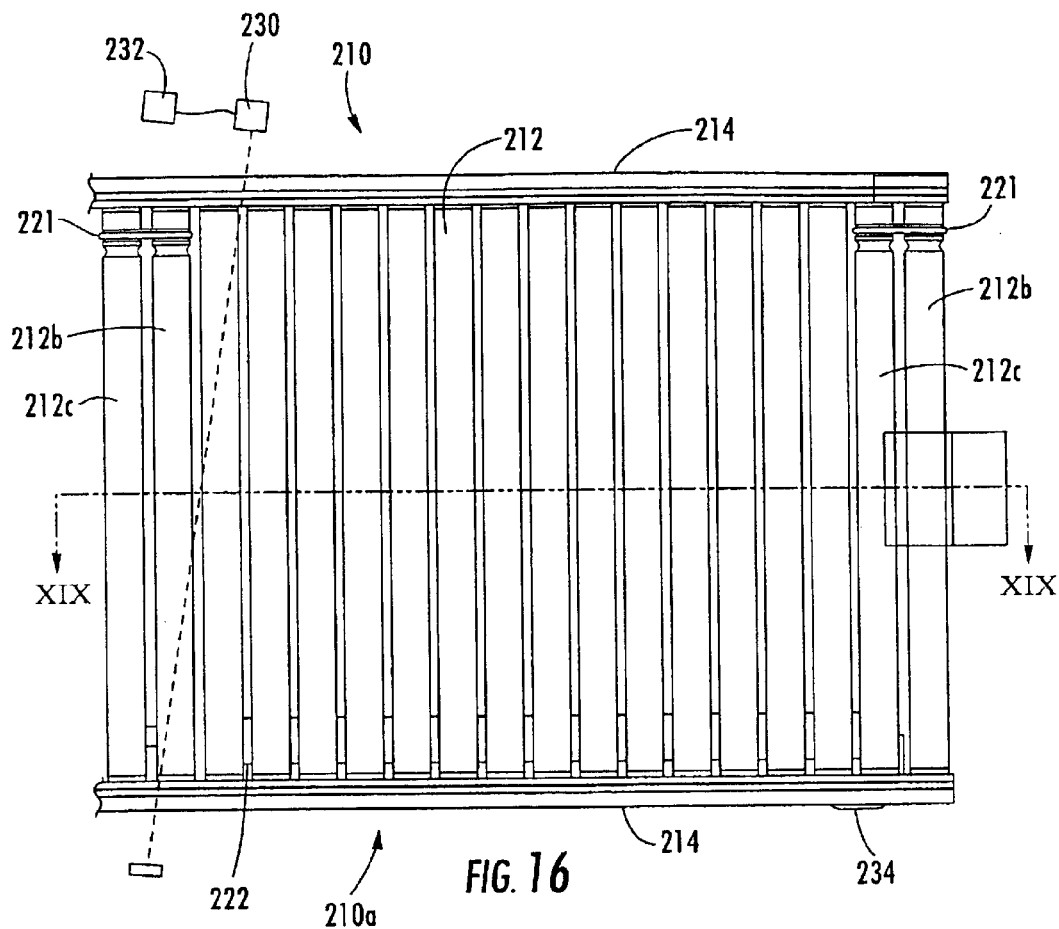
FIG. 16 is plan view of a roller conveyor section or zone with another tape drive system in accordance with the present invention.

As best shown in FIGS. 13–15, second take up device 127' includes a pair of rollers 138 which are rotatably mounted to an adjustable block 140, which in turn is adjustably mounted to a mounting plate 142 mountable to or positionable at sidewall 114' of conveyor 110'. Adjustable block 140 may be pivotable about a pivot pin or axis 140a and includes a pair of extensions or tabs 140b (FIG. 15), which are insertable into and at least partially through a corresponding pair of openings 142a in mounting plate 142 to secure adjustable block 140 and thus rollers 138 in the desired location, as discussed below. Adjustable block 140 may include a biasing member or spring 140c (FIG. 15) to allow for adjustment of adjustable block 140 relative to mounting plate 142 and to bias or retain tabs 140b in openings 142a, as also discussed below.

As shown in FIG. 15, rollers 138 include generally cylindrical roller portions 138a, which are rotatably mounted to respective pins or axles 138b via bearings or bearing assemblies 138c. Pins 138b may include spacers 138d positioned around pins 138b and between bearings 138d. Pins 138b are mounted to adjustable block 140, such that rollers 138 are spaced apart to allow for routing of tape 122' around and between the rollers, as discussed below.

As shown in FIG. 12, mounting plate 142 may be mounted to sidewall 114' of conveyor 110'. In the illustrated embodiment, mounting plate 142 includes a lip or flange 142b at one end and a flange or bracket 142c at another end. Lip 142b may engage or insert into and/or through an opening (not shown) in sidewall 114', while bracket 142c may be secured to a cross member 144 of conveyor 110'. However, other mounting arrangements may be implemented, such as mounting flanges or tabs which do not extend into or through the sidewall, such that the mounting plate may set generally flush against the sidewall or side channel, and/or other tabs, flanges, fasteners and/or the like, without affecting the scope of the present invention. When mounting plate 142 is mounted to conveyor 110', roller portions 138a of rollers 138 are positioned generally beneath and in line with snubbers 126', such that tape 122' may be routed or reeved around snubbers 126', motorized roller 118', end guide 124' and roller portions 138a of second take up device 127'.

When tape drive system 116' is assembled to roller conveyor 110', tape 122' may be reeved around and between rollers 138 of take up device 127'. The adjustable block 140 may be rotated relative to bracket 142 to take up the slack or stretch and to adjust the tension in tape 122'. More particularly, adjustable block 140 may be pulled outwardly from bracket 142 to release tabs 140b from the corresponding openings 142a in bracket 142, and then may be rotated about fastener 140a to align the tabs 140b with a next pair of openings 142a in bracket 142. For example, the block 140 may be rotated in a counter-clockwise direction in FIG. 12 to take up slack or stretch or to tighten or increase the tension in tape 122'. When the tabs 140b are aligned with another pair of openings 142a, block 140 may be released, whereby biasing member 140c urges or biases the tabs 140b into engagement with the openings 142a to retain block 140 and rollers 138 at the desired orientation.

Tape drive system 116' may thus provide an elongated tape drive system for rotatably driving the rollers of an elongated roller conveyor or roller conveyor section. The initial slack or stretch in the tape 122' of tape drive system 116' may be taken up by the second take up device 127' and the adjustable end guide 124', such that the tape is properly tensioned around the motorized roller 118', snubbers 126', end guide 124' and take up device 127'. The elongated roller conveyor 110' may provide a conveyor section between other conveyors or sections of conveyors or between or at other loading or unloading conveyor sections or platforms or the like. The tape drive system 116' may be generally continuously operable to drive motorized roller 118' to generally continuously drive the rollers 112' of conveyor 110' to convey articles along the conveyor, or may be selectably operable to convey articles along the conveyor. Optionally, the conveyor may include one or more article sensors (not shown in FIG. 12) for sensing articles or product which may be conveyed or positioned along roller conveyor 110'.

Referring now to FIGS. 16–21, a roller conveyor 210 includes a plurality of rollers 212 mounted to and extending between a pair of opposite sidewalls 214 and a tape drive system 216 which is operable to drive the rollers 212 of the conveyor 210 via driving a drive member or tape or belt 222 which is engaged with the rollers 212 of a respective zone 210a of roller conveyor 210. Roller conveyor 210 and tape drive system 216 are substantially similar to conveyor 110 and tape drive system 116 discussed above, such that a detailed discussion of the conveyor and tape drive system will not be repeated herein. Suffice it to say that tape drive system 216 includes one or more tape drive units 217, each of which includes a continuous tape or belt 222 routed or reeved around a directly driven roller or pulley 218, a plurality of snubbers or engaging rollers or guides 226, and an adjustable end roller or pulley or guide 224, such that the tape 222 is movable in a continuous loop around the roller 218, snubbers 226 and guide 224. Rotation of driven roller 218 causes corresponding rotation of the idler rollers 212 of the conveyor via tape 222 being snubbed or urged or forced against the lower portion 212a of the rollers 212 by snubbers 226, in a similar manner as discussed above.

Also similar to roller conveyor 10 and tape drive system 16, discussed above, the end rollers 212b, 212c of the end of each zone 210a at driven roller or pulley 218 may include an O-ring 221 to drive end roller 212b via rotation of adjacent roller 212c. Also, end guide or snubber 224 may be adjustably mounted at the sidewall 223 of tape drive unit 217 and/or sidewall 214 of conveyor 210, so that end guide 224 may be adjusted to adjust the tension in tape 222 reeved therearound. Each snubber 226 may be rotatably mounted to a mounting assembly 228, which may be mounted to sidewall or frame 223 of each tape drive unit 217 of tape drive system 216. Each mounting assembly 228 may include spaced apart finger guards 229a, 229b which extend over tape 222. The finger guards 229a, 229b of each mounting assembly 228 may be spaced apart at a desired separation distance which may generally correspond to the spacing between the idler rollers 212 of conveyor 210. The driven roller 218, snubbers 226 and end guide 224 may be mounted at sidewall 223 in a cantilevered manner, such that they extend from the sidewall and have unsupported ends opposite the sidewall.

Figure 17:
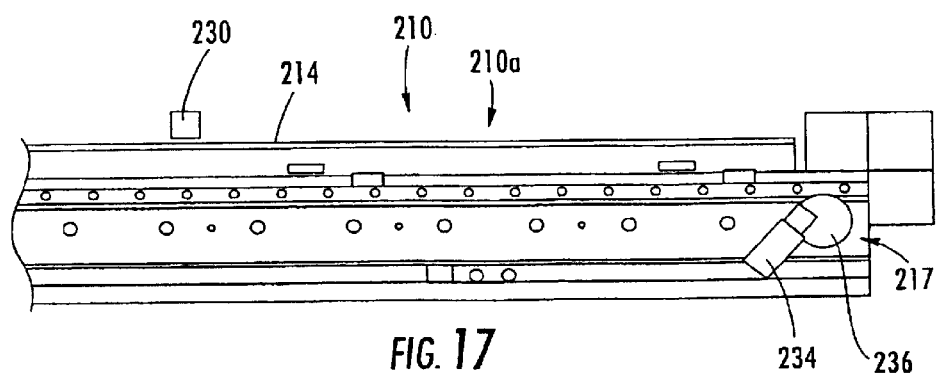
FIG. 17 is a side elevation of the roller conveyor section and tape drive system of FIG. 16.
Figure 18:
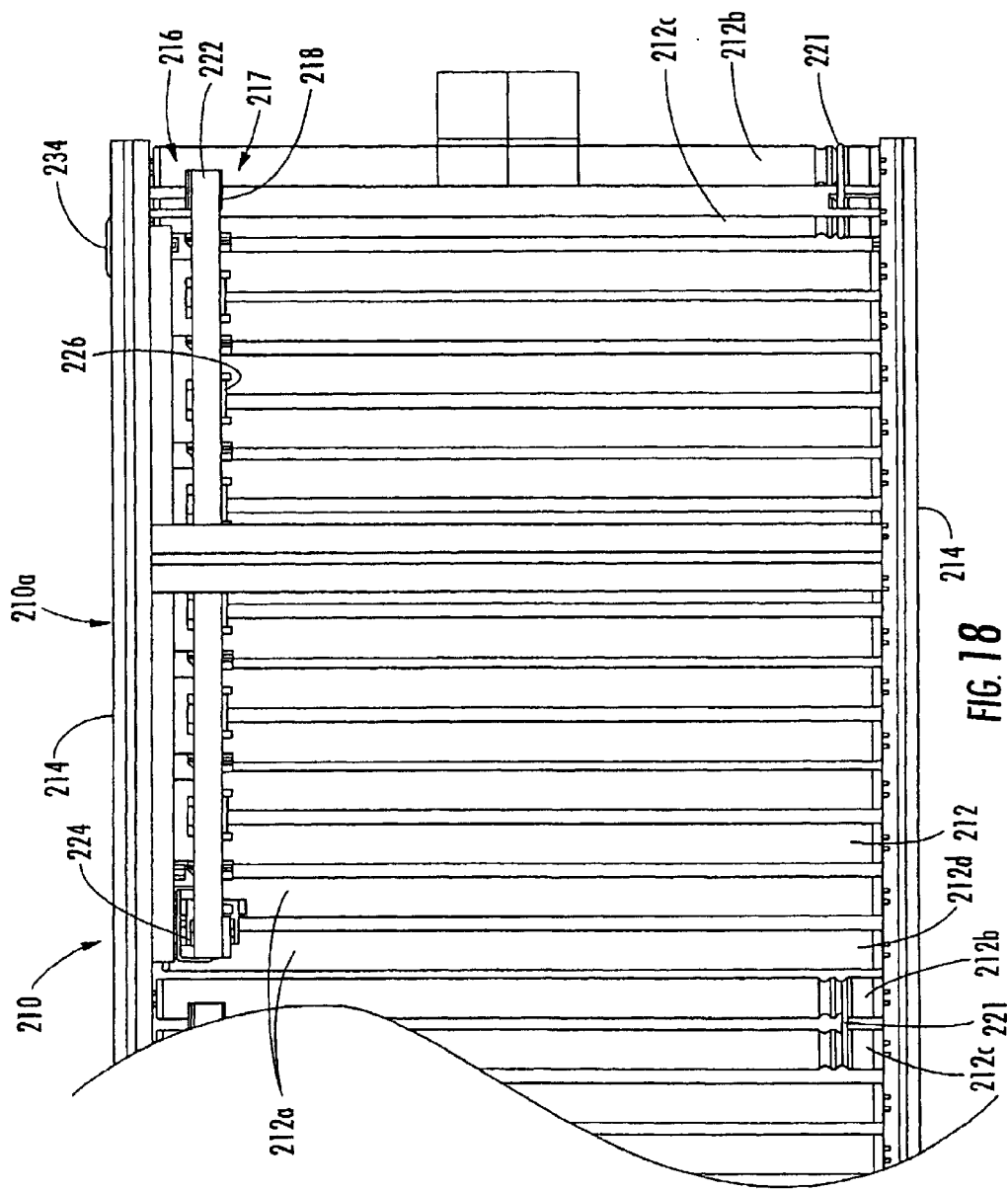
FIG. 18 is a bottom plan view of the roller conveyor section and tape drive system of FIGS. 16 and 17.
Figure 20:
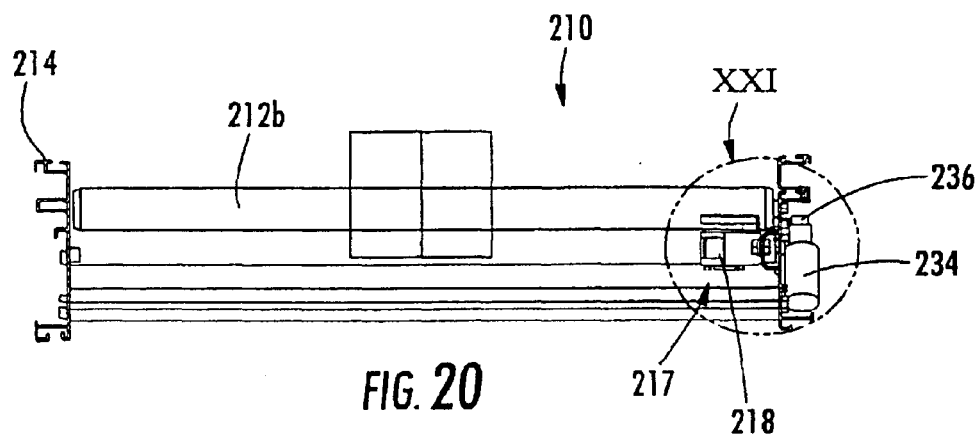
FIG. 20 is a sectional view of the conveyor section and tape drive system taken along the line XX—XX in FIG. 19.
Figure 21:
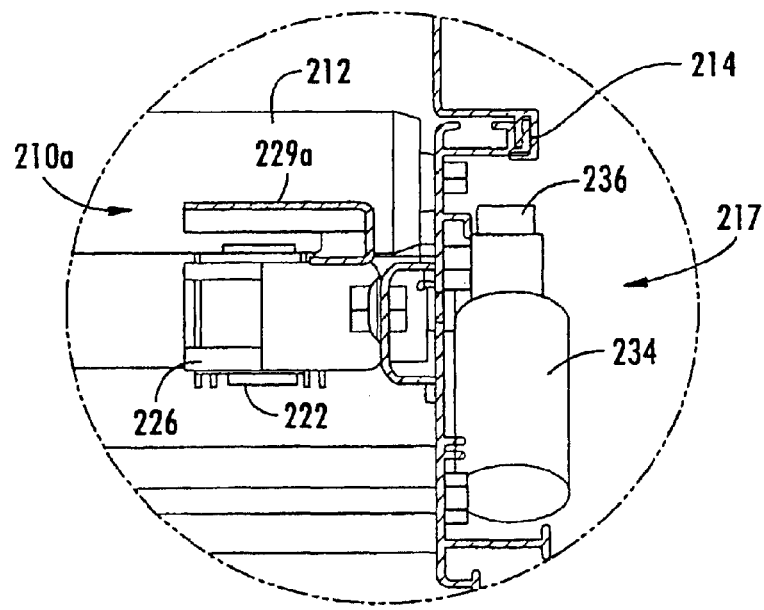
FIG. 21 is an enlarged sectional view of the area XXI in FIG. 20.

Driven roller 218 may comprise a directly driven roller or pulley or drum which may be directly driven or rotated by a motor 234 and a gear box 236 positioned at and substantially within one of the sidewalls 214 of zone 210a of roller conveyor 210 (as best shown in FIGS. 17, 20 and 21). As can be seen in FIGS. 17, 20 and 21, gear box 236 provides for drive transmission to the driven roller 218 while the motor 234 is positioned at an angle relative to the axis of rotation of the driven roller 218. Such an arrangement allows the motor 234 of each driven roller 218 of a respective tape drive unit 217 to be positioned substantially along and at least partially within the sidewall 214 of conveyor 210. Each drive motor 234 is thus operable to directly drive a respective driven roller 218 without any drive belt or band or the like between the drive motor and the driven roller. Each drive motor 234 may be selectively operable to rotatably drive the respective driven roller 218 to rotate the rollers 212 of the respective zone 210a independently of the drive motor or motors of the tape drive units of the other zones of the roller conveyor 210. The tape drive system of the present invention thus provides for independent operation of each tape drive unit 217, and allows for direct starting and stopping of the driven roller, thereby avoiding excessive wear on a drive belt or band or the like.

Because driven roller 218 may comprise a short pulley or drum which may be cantileverly mounted at the sidewall of the conveyor, installation and removal of the belt 222 for tape drive unit 217 may be improved. The belt or tape may be reeved over and around the driven roller, snubbers and end guide, which all may be cantileverly mounted at the sidewall or side frame of the tape drive unit. Therefore, no mounting components or brackets may be at the free or unsupported ends of the rollers, snubbers and/or guides which would otherwise interfere with removing or installing the tape or belt on the tape drive unit.

Similar to tape drive system 16, discussed above, when motor 234 is activated to rotate driven roller 218, tape 122 is moved and functions to impart a corresponding rotation to the roller portions of the idler rollers 212 of conveyor 210 via rolling or frictional engagement with the idler rollers 212. Most or all of the idler rollers 212 of the zone 210*a* thus may be driven in response to activation of the driven roller 218 and engagement of the tape 222 with the idler rollers 212. The driving of the rollers 212 may be stopped by deactivating the motor 234 of driven roller 218.

Also similar to tape drive system 16, discussed above, tape drive system 216 may include an article or product sensor 230 (FIGS. 16 and 17) positioned at or between the zones 210*a* of conveyor 210. Tape drive system 216 may be operable, such as via a control 232, to convey and/or accumulate articles along or on the zones of the conveyor in response to the product sensor or sensors, such as in the manner described above.

Referring now to FIG. 22, a roller conveyor 310 includes a plurality of rollers 312 mounted to and extending between a pair of opposite sidewalls 314 (only one sidewall shown in FIG. 22) and a tape drive system 316 which is operable to drive the rollers 312 of the conveyor 310 in response to rotation of one of the rollers. The rollers 312 include at least one powered or driven or motorized roller 318 and a plurality of idler or freely rotating rollers 320. The tape drive system 316 includes a continuous tape or belt 322 which is routed or reeved around a pair of end pulleys or guides 324*a*, 324*b*, such that the tape 322 is movable in a continuous loop around the end guides 324*a*, 324*b*. The tape drive system 316 further includes a plurality of snubbers or engaging rollers or guides 326 which urge tape 322 into engagement with motorized roller 318 and at least some of the idler rollers 320. Rotation of motorized roller 318 thus causes driving of tape 322 which causes a corresponding rotation of the idler rollers 320 via tape 322 being snubbed or forced against the lower portion 312*a* of the rollers 312.

Snubbers 326 are positioned generally between at least some of the adjacent pairs of rollers 312, with tape 322 wrapped or reeved around the end guides 324*a* and snubbers 326. In the illustrated embodiment, motorized roller 318 is positioned at an end of a zone or section 310*a* of conveyor 310, with a plurality of idler rollers 320 positioned downstream or in the direction of conveyance (shown generally at arrow A in FIG. 22) from motorized roller 318. Snubbers 326 may be spaced along the zone 310*a* and positioned between at least some of the other adjacent pairs of rollers 312. The snubbers 326 may be positioned upward and partially between the adjacent pairs of rollers, such that they may be in an engaging position, whereby the snubbers force or urge tape 322 into engagement with the lower portion 312*a* of the adjacent rollers. As can be seen in FIG. 22, snubbers 326 may be positioned such that an upper surface or portion 326*a* of snubbers 326 is at or above the lower surface or portion 312*a* of rollers 312, whereby tape 322 is urged into engagement with lower portion 312*a* of rollers 312 at either side of snubber 326.

Because additional snubbers 326 are spaced along the zone 310*a* of the conveyor 310, the tape 322 may be forced into engagement with substantially each of the rollers of the zone 310*a*. One snubber 326 may be positioned at one side of motorized roller 318 and between the motorized roller 318 and an adjacent one of the idler rollers 320, while an end snubber or end guide 324*a* may be positioned at the other side of motorized roller 318, to ensure tight engagement of tape 322 to motorized roller 318. A snubber 326 may be positioned at approximately every other gap between adjacent rollers, such that substantially each roller 312 of zone 310*a* may have tape 322 pressed against the lower portion 312*a* of the roller by a snubber 326 or end guide 324*a*, 324*b* positioned at at least one side of the roller, as can be seen in FIG. 22.

Tape 322 comprises a continuous belt or tape which may be tightly reeved around the end guides 324*a*, 324*b* and snubbers 326. Tape 322 may be a generally flat and flexible tape or belt. The material for tape 322 may be selected such that tape 322 provides sufficient frictional resistance to slippage on the rollers, snubbers and end guides so as to efficiently move along and around the end guides and snubbers and to drive the idler rollers in response to rotation of the motorized or powered roller. Tape 322 may have a greater thickness than a conventional O-ring and, thus, may provide a more robust drive system than a conventional O-ring driven system.

Motorized roller 318 may be a motorized or self driven roller with an internal motor which is operable to rotate a roller portion relative to a shaft portion (not shown) of the motorized roller. For example, motorized roller 318 may be of the type commercially available from various sources, such as Siemens Dematic Corporation, Rapistan Material Handling Automation Division of Grand Rapids, Mich., such as a 12 Volt DC or a 24 Volt DC motorized roller or the like, such as discussed above with respect to motorized roller 18. Motorized roller 318 drives tape 322 which moves along the idler rollers 320, which freely rotate about their shaft portions. The idler rollers 320 may be conventional, freely rotating rollers, such as the types also commercially available from various sources, such as Siemens Dematic Corporation, Rapistan Material Handling Automation Division of Grand Rapids, Mich. The shafts of the rollers may be mounted within holes or apertures (not shown) in sidewalls 314 to limit or substantially preclude upward movement of the rollers 312 due to the upward pressure exerted on the rollers via snubbers 326 and tape 322. Alternately, the rollers 312 may be mounted to the sidewalls 314 of the conveyor via any other mounting means, without affecting the scope of the present invention.

Accordingly, when motorized roller 318 is activated, the roller portion is rotated or driven relative to its shaft portion and moves or drives tape 322 via engagement of the roller portion with the tape. Tape 322 then functions to impart a corresponding rotation to the roller portions of the idler rollers via rolling or frictional engagement with the motorized roller 318 and idler rollers 320. The location of motorized roller 318 may be selected such that motorized roller is at the upstream end of zone 310*a*, such that rotation of motorized roller 318 (such as in a clockwise direction in FIG. 22) tends to pull at the upper run of tape 322 which, in turn, causes a corresponding clockwise rotation of the idler rollers 320 of zone 310*a* to move articles along zone 310*a* in the direction of conveyance A. Most or all of the idler rollers 320 of the zone 310*a* thus may be driven in response to activation of the motorized roller 318 and engagement of the tape 322 with the motorized roller 318 and the idler rollers 320. Rotation of the rollers 320 may be stopped by deactivating the motorized roller 318.

Similar to tape drive system 16, discussed above, tape drive system 316 may include an article or product sensor (not shown in FIG. 22) positioned at or between zones or sections 310a of conveyor 310. Tape drive system 316 may be operable, such as via a control (also not shown), to convey and/or accumulate articles along or on the zones of the conveyor in response to the product sensor or sensors, such as described above.

Optionally, the snubbers 326 may be vertically movable relative to the sidewalls 314 and the rollers 312 between an engaging position, whereby the tape 322 is snubbed or pressed against a lower portion 312a of the rollers 312 (as shown in FIG. 22), and a disengaging position, whereby the tape 322 is lowered and thus disengaged from the rollers 312 (not shown). The end guides 324a, 324b may also be vertically movable with respect to the sidewalls 314 and rollers 312 to move the ends of the tape 322 between the engaging and disengaging positions with respect to the rollers 312. The idler rollers 320 may then be driven in response to activation of the motorized roller 318 and engagement of the tape 322 with the rollers 312. Tape 322 may be disengaged from at least the motorized roller and/or the motorized roller may be deactivated to stop the driving of the rollers 320 of the zone 310a of roller conveyor 310.

Because the tape drive system of the present invention may be more robust than conventional O-ring systems, the tape drive system may not burn out as quickly if slippage occurs between the rollers and the tape, because the tape is more robust than conventional O-rings and the rollers will slip on the tape only at the respective contact areas of the tape and rollers. Optionally, the conveyor may include a sensor for detecting an increase in the current flow of the motor of the motorized roller, whereby the system may shut down the motor in response to a threshold amperage being detected, in order to minimize the amount of slippage which may occur between the rollers and the tape. The tape drive system of the present invention thus is well suited for full contacting accumulation on the zone or zones of the conveyor without the high maintenance costs and down time associated with replacing burned out O-rings or the like. Also, because the tape drive system provides a more robust drive system, the conveyor may be capable of higher speed operation. For example, the tape drive system and roller conveyor may be capable of conveying articles along the rollers at approximately 600 fpm.

Figure 24:
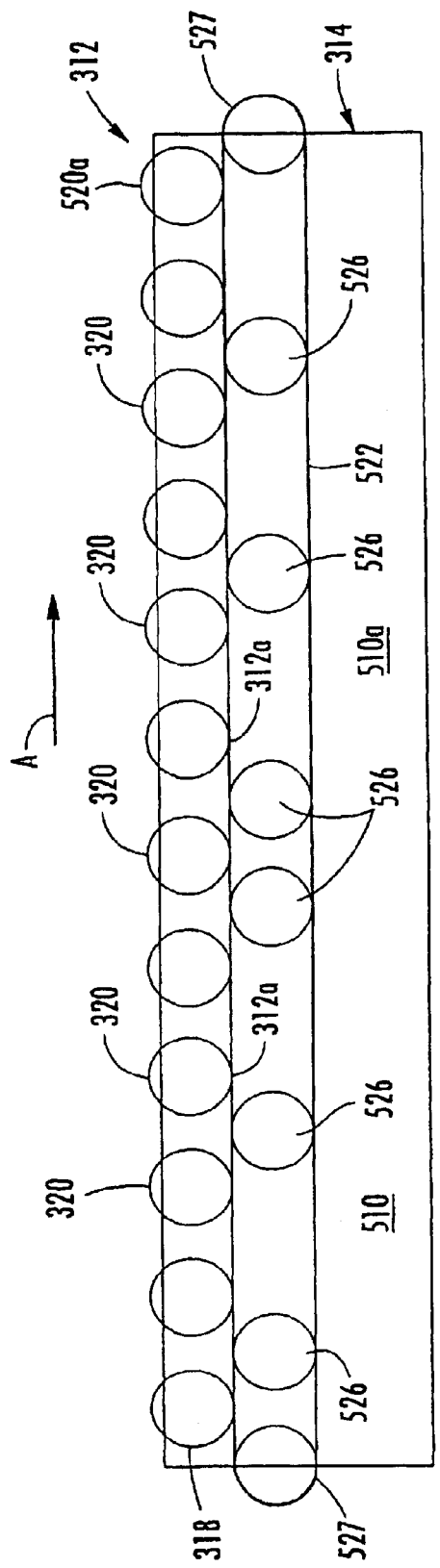
FIG. 24 is a side elevation of another roller conveyor and tape drive system in accordance with the present invention.

As shown in FIG. 23, a roller conveyor 410 may include an additional larger diameter snubber or end roller or guide 427 at one end of the zone 410a, such as at the downstream end of the zone 410a, rather than a second end guide (such as a second end guide similar to an end guide 424b at the opposite or upstream end of zone 410a from snubber 427). Such a zone 410a may be implemented when the zone 410a is positioned adjacent another zone (not shown) of the conveyor 410. The additional snubber 427 and the other snubbers 426 may then function to urge the tape 422 into engagement with an end roller 420a of zone 410a and an end roller (not shown) of the adjacent zone. Alternately, as shown in FIG. 24, both end guides of a zone 510a of a conveyor 510 may be replaced with a larger diameter end snubbers 527. The zone 510a may be implemented between a pair of zones or other roller sections (not shown) of the conveyor 510, whereby the end snubbers 527 may urge the tape 522 into engagement with a respective end roller 318, 520a of the zone 510a and a respective end roller (not shown) of the adjacent zones or other roller sections, while snubbers 526 urge the tape into engagement with the rollers 312 of the zone 510a. Roller conveyors 410 and 510 are otherwise substantially identical to roller conveyor 310, such that a detailed discussion of the conveyors, rollers and tape drive systems will not be repeated herein.

Therefore, the present invention provides a robust tape drive system for a powered roller conveyor. The tape drive system drives a plurality of idler rollers in response to rotation of a powered or motorized or directly driven roller. The roller conveyor and tape drive system of the present invention may be capable of accumulating more than one article in each zone of the conveyor and may provide full contacting accumulation on one or more zones, without requiring excessive maintenance to replace burned out O-rings. The respective motor of each of the motorized rollers or driven rollers may be independently actuatable to drive or rotate the rollers of the respective zone of the conveyor via the tape or belt. The motors of the driven rollers may be independently actuatable and deactuatable to directly drive or rotate the respective roller portions without drive belts or the like between the motors and the respective driven roller portions. If replacement of the tape of the tape drive system of the present invention is necessary, the single continuous tape may be replaced without having to remove or partially remove the rollers from the sidewalls of the conveyor. Also, the roller conveyor of the present invention may be capable of greater speeds of operation over conventional roller conveyors which are driven via O-rings between adjacent pairs of rollers.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property right or privilege is claimed are defined as follows:

1. A tape drive conveyor comprising:
    a motorized roller having a roller portion, a mounting portion and an internal motor that rotates said roller portion relative to said mounting portion;
    a plurality of snubbers;
    a tape reeved around said plurality of snubbers, said snubbers being configured and positionable to engage said tape with a plurality of idler rollers of said conveyor to drive the idler rollers in response to rotation of said roller portion of said motorized roller;
    a current sensor that senses the current draw of said internal motor of said motorized roller; and
    a control responsive to said current sensor, said control determining slippage between said tape and at least one of the idler rollers and said roller portion of said motorized roller as a function of an increase in current draw of said internal motor, said control selectively activating and deactivating said internal motor of motorized roller in response to slippage between said tape and at least one of the idler rollers and said roller portion of said motorized roller.

2. The tape drive conveyor of claim 1, wherein said control selectively activates and deactivates said internal motor in response to an increase in current draw to a threshold level that is indicative of a threshold amount of said tape slippage.

3. The tape drive conveyor of claim 1 including at least one article sensor positionable along said conveyor and operable to sense articles being conveyed along said conveyor, said control being responsive to said at least one article sensor.

4. The tape drive conveyor of claim 1, wherein said roller conveyor comprises at least two accumulating sections, each of said accumulating sections comprising a plurality of idler rollers, a motorized roller, a plurality of snubbers, a tape reeved around said plurality of snubbers and a current sensor.

5. The tape drive conveyor of claim 4, wherein said control is responsive to said current sensors and operates to accumulate articles on one or more of said accumulating sections.

6. The tape drive conveyor of claim 5, wherein each of said accumulating sections includes an article sensor for sensing articles being conveyed along said roller conveyor, said control being responsive to said article sensors.

7. The tape drive conveyor of claim 1, wherein said mounting portion of said motorized roller is mounted to at least one sidewall of said conveyor.

8. A tape drive conveyor for conveying and accumulating articles, said tape drive conveyor comprising:
   at least two zones, each of said at least two zones comprising:
      a plurality of idler rollers rotatably mounted at and between opposite sidewalls;
      a motorized roller having a roller portion, a mounting portion and an internal motor which operates to rotate said roller portion relative to said mounting portion;
      a plurality of snubbers; and
      a tape reeved around said plurality of snubbers, said snubbers being configured and positioned to continuously engage said tape with said idler rollers to drive said idler rollers in response to rotation of said roller portion of said motorized roller; and
   a control, said control controlling said internal motors of said motorized rollers of said at least two zones to accumulate product on said at least two zones, said conveyor allowing limited slippage between said tape and said idler rollers and thereby providing contacting accumulation of articles wherein one or more articles are accumulated on at least some of said at least two zones.

9. The tape drive conveyor of claim 8, wherein said tape slips against at least one of said motorized roller and said idler rollers to allow for contacting accumulation of articles on said idler rollers of a respective one of said zones.

10. The tape drive conveyor of claim 8, wherein said tape slips against at least one of said motorized roller and said idler rollers when said motorized roller is deactivated so that an article on said idler rollers coasts at least partially along the respective zone.

11. The tape drive conveyor of claim 8, wherein said tape is reeved around said motorized roller.

* * * * *